(12) United States Patent
Kaburagi

(10) Patent No.: US 6,519,366 B1
(45) Date of Patent: Feb. 11, 2003

(54) IMAGE PROCESSING APPARATUS, IMAGE PROCESSING METHOD, AND MEMORY MEDIUM

(75) Inventor: Hiroshi Kaburagi, Yokohoama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/318,600

(22) Filed: May 26, 1999

(30) Foreign Application Priority Data

May 28, 1998 (JP) ............................................ 10-147956

(51) Int. Cl.[7] ................................................. G06K 9/36
(52) U.S. Cl. ......................... 382/251; 341/200; 358/465
(58) Field of Search ................................. 382/251, 252; 358/465, 466, 298, 1.9

(56) References Cited

U.S. PATENT DOCUMENTS 5,777,759 A  7/1998  Kaburagi et al. ............ 358/536

*Primary Examiner*—Joseph Mancuso
*Assistant Examiner*—Anand P Bhatnagar
(74) *Attorney, Agent, or Firm*—Fitzpatrick, Cella, Harper & Scinto

(57) ABSTRACT

An error compression circuit compresses an error component E/2 and stores it in a line buffer. An error reconstruction circuit expands the compressed error component. The error compression circuit uses two pixels as a unit, adds error components E/2 for pixels belonging to each unit, and stores the sum as a compressed error component E'. The error reconstruction circuit divides by 2 the compressed error component E' read out from the line buffer, and outputs the resultant component for the period of two pixels to reconstruct the error component E/2.

16 Claims, 23 Drawing Sheets

ERROR (DATA) CAN BE HELD UP TO 4 BITS (±7) BY USING MEMORY FOR 2 BITS (±1) PER PIXEL IN UNITS OF TWO PIXELS

```
INITIALIZATION
    for ( i i =25; i i ≧0; --i i ) {p[i i]=0;}
    p[12]=1;

GENERATE RANDOM NUMBER
    p[0]=((p[25]^ p[24]^ p[23]^ p[22])&1);
    for ( k =24; k ≧0; --k ) {
        p[k+1]=p[k];
    }
    RANDOM NUMBER=(1-2*p[22]*(((p[15]*64+p[16]*32+p[17]*16
                 +p[18]*8+p[19]*4+p[20]*2+p[21]*17)/128);
```

GENERATE RANDOM NUMBER
−17≦RANDOM NUMBER≦17

```
if(DR≦LR1) {
    II=0;
}
else if(LR1<DR && DR≦LR2) {
    II=((DR - LR1 * (ALF * 256 / (LR2 - LR1))) / 256;
}
else if(LR2<DR && DR≦LR3) {
    II=ALF;
}
else if(LR3<DR && DR≦LR4)
    II=ALF - ((DR - LR3) * (ALF * 256 / (LR4 - LR3))) / 256;
}
else {
    II=0;
}
T=II - ALFm
```

HYSTERESIS CONTROLLED VALIABLE CALCULATION SECTION

※
LR1 : CONSTANT (16)
LR2 : CONSTANT (48)
LR3 : CONSTANT (223)
LR4 : CONSTANT (255)
ALF : CONSTANT (32)
ALFm: CONSTANT (16)

if(B32==0 && B22==1 && B12==0 && B21==0 && B11==1 && B01==0) {
    S'=15;
}
else if(Bi12==0 && Bi22==1 && Bi32==0 && B01==0 && Bi11==1 && Bi21==0) {
    S'=15;
}
else if(B12==0 && B02==0 && Bi12==0 && Bi22==0 && Bi32==0
    && B11==0 && B01==0 && Bi11==1 && Bi21==0 && Bi31==0 && B20==0) {
    if(D<31) {S'=15;}
    else {    S'=0;}
}
else if(B32==0 && B22==0 && B12==0 && B02==0 && Bi12==0
    && B31==0 && B21==0 && B11==1 && B01==0 && Bi11==0 && B20==0) {
    if(D<31) {S'=15;}
    else {    S'=0;}
}
else if(B02==0 && Bi12==0 && B11==0 && B01==1 && Bi11==1 && Bi21==0 && B20==0) {
    S'=-A;
}
else if((B02==0 || Bi12==0) && B11==0 && B01==1 && Bi11==1 && Bi21==0) {
    S'=-B;
}
else if(B12==0 && B02==0 && B21==0 && B11==1 && B01==1 && Bi11==0 && B20==0) {
    S'=-A;
}
else if((B12==0 || B02==0) && B21==0 && B11==1 && B01==1 && Bi11==0) {
    S'=-B;
}
else if(B12==0 && B02==0 && B21==0 && Bi11==0 && Bi21==0 && B20==0) {
    S'=-A;
}
else if(B12==0 && B02==1 && Bi12==0 && B21==0 && B11==1 && B01==0 ) {
    S'=-B;
}
else {
    S'=0;
}
```

THRESHOLD CALCULATION SECTION

305

※
LT1 : CONSTANT (2)
LT2 : CONSTANT (4)
LT3 : CONSTANT (8)
LT4 : CONSTANT (16)

TARGET PIXEL

```
if(D≦N1) {
    P1=RD/SL;
}
else if((N1<D) && (D≦N2)) {
    P1=(RD-RD/SL)✻(D-N1) / (N2-N1)+RD/SL;
}
else if((N3≦D) && (D<N4)) {
    P1=(RD-RD/SL)✻(N4-D) / (N4-N3)+RD/SL;
}
else if(N4≦D)   {
    P1=RD/SL;
}
else {
    P1=RD;
}
```

ADDITION VARIABLE CONTROL SECTION

※ROUND OFF ALL DIVISION RESULTS

if(B32==0 && B22==1 && B12==0 && B21==0 && B11==1 && B01==0) {
    S'=30;
}
else if(Bi12==0 && Bi22==1 && Bi32==0 && B01==0 && Bi11==1 && Bi21==0) {
    S'=30;
}
else if(B12==0 && B02==0 && Bi12==0 && Bi22==0 && Bi32==0
    && B11==0 && B01==0 && Bi11==1 && Bi21==0 && Bi31==0 && B20==0) {
    if(D<31) {S'=30;}
    else {    S'=0;}
}
else if(B32==0 && B22==0 && B12==0 && B02==0 && Bi12==0
    && B31==0 && B21==0 && B11==1 && B01==0 && Bi11==0 && B20==0) {
    if(D<31) {S'=30;}
    else {    S'=0;}
}
else if(B02==0 && Bi12==0 && B11==0 && B01==1 && Bi11==1 && Bi21==0 && B20==0) {
    S'=-A;
}
else if((B02==0 || Bi12==0) && B11==0 && B01==1 && Bi11==1 && Bi21==0) {
    S'=-B;
}
else if(B12==0 && B02==0 && B21==0 && B11==1 && B01==1 && Bi11==0 && B20==0) {
    S'=-A;
}
else if((B12==0 || B02==0) && B21==0 && B11==1 && B01==1 && Bi11==0) {
    S'=-B;
}
else if(B12==0 && B02==0 && B21==0 && Bi11==0 && Bi21==0 && B20==0) {
    S'=-A;
}
else if(B12==0 && B02==1 && Bi12==0 && B21==0 && B11==1 && B01==0 ) {
    S'=-B;
}
else {
    S'=0;
}
```

THRESHOLD CALCULATION SECTION

305

※ LT1 : CONSTANT (2)
LT2 : CONSTANT (4)
LT3 : CONSTANT (8)
LT4 : CONSTANT (16)

IMAGE PROCESSING APPARATUS, IMAGE PROCESSING METHOD, AND MEMORY MEDIUM

BACKGROUND OF THE INVENTION

1. Field of the Invention

The present invention relates to an image processing apparatus, image processing method, and memory medium and, more particularly, to an image processing apparatus and image processing method for quantizing a multilevel image signal, and a memory medium.

2. Description of the Related Art

General image formation methods for halftone expression include error diffusion and mean density preserving method. These methods realize macroscopic halftone expression by expressing a density as a variation of an area where dot is on using a small number of gradation levels.

This processing increases the capacity of a line memory for holding quantization errors along with an increase in data resolution (an increase in resolution from 400 dpi to 600 dpi).

FIG. 3 is a block diagram showing an example of the arrangement of a gradation conversion section in the image formation apparatus. In FIG. 3, an error correction section 302 receives a signal DR' obtained by dividing by a constant (17) a signal prepared by pre-processing an input multilevel image signal D, and binarization error data E generated in abinarization section 301. The error correction section 302 generates an image signal DE error-corrected using a line memory.

FIG. 24 is a block diagram showing an example of the conventional arrangement of the error correction section 302. The input binarization error data E is limited to a value from "−6 to +6" by limiter processing by a circuit (not shown) so as to avoid the influence of past binarization results called "false edge" when the input multilevel image signal D abruptly changes from a high density to a low density.

The binarization error data E limited to "−6 to +6" is halved by a division circuit 501. The quotient (E/2) is supplied to a subtraction circuit 502 and line buffer 503.

The subtraction circuit 502 calculates a difference EB (=E−E/2) between the binarization error data E and E/2 as an error component distributed to a pixel of interest, and supplies the difference to an addition circuit 504. The addition circuit 504 adds an error component EA delayed by one line by the line buffer 503 for one line of 3-bit pixels, and an error component EB supplied from the subtraction circuit 502, and supplies the sum (EA+EB) to an addition circuit 505.

The addition circuit 505 adds the error component sum (EA+EB) and the image signal DR' and outputs the sum as an image signal DE. That is, as shown in FIG. 6, the error correction section 302 shown in FIG. 24 adds to the pixel value of the pixel of interest (DR') the error component EA of a binarization error generated when a pixel A on one line is binarized, and the error component EB of a binarization error generated when a pixel B before one pixel is binarized.

The line buffer 503 holds 3-bit (−3 to +3) outputs from the division circuit 501 by one line. For example, the line buffer 503 has a capacity of 7,200 pixels×3 bits for an image resolution of 600 dpi and one line of 12 inch.

As the tones of images processed by image formation apparatuses such as a copying machine and printer become finer, the image resolution is projected to greatly increase. However, if the capacity of the line memory for holding quantization errors is increased with an increase in resolution, the cost of the line memory also increases. For example, a 4,800-pixel line memory is required to process an image at a resolution of 400 dpi, and a 7,200-pixel line memory is required to process an image at a resolution of 600 dpi. This simply increases the cost of the line memory to 1.5 times. If the resolution increases from 400 dpi to 800 dpi, the cost of the line memory doubles.

In this way, in the prior art, the capacity of the line memory must be increased in proportion to an increase in resolution.

SUMMARY OF THE INVENTION

The present invention has been made in consideration of the above situation, and has as its object to reduce the capacity of a memory necessary for image processing.

According to the present invention, there is provided an image processing apparatus for quantizing a multilevel image signal, comprising quantization means for quantizing a multilevel image signal for a pixel of interest, compression means for compressing an error component generated based on a quantization error generated by quantization, and storing the compressed error component in a memory, reconstruction means for reading out the compressed error component from the memory and reconstructing the error component, and correction means for correcting the multilevel image signal for the pixel of interest referred to by the quantization means on the basis of the reconstructed error component.

In the image processing apparatus, the compression means preferably uses, e.g., n (n≧2) pixels as a unit, generates synthesis data obtained by synthesizing error components belonging to each unit, and stores the synthesis data in a memory as a compressed error component for the unit.

In the image processing apparatus, the reconstruction means preferably decomposes each synthesis data as a compressed error component read out from the memory, thereby reconstructing an error component for each pixel.

In the image processing apparatus, the compression means preferably uses, e.g., n (n≧2) pixels as a unit, calculates a sum of error components belonging to each unit, and stores the sum in the memory as an error component compressed for the unit.

In the image processing apparatus, the reconstruction means preferably multiplies by, e.g., 1/n each sum as a compressed error component read out from the memory, and outputs the product for a period of n pixels.

In the image processing apparatus, the memory is preferably, e.g., a line memory.

According to another aspect of the image processing apparatus of the present invention, there is provided an image processing apparatus for quantizing a multilevel image signal, comprising first arithmetic means for multiplying a signal value of a multilevel image signal by n (n≧2) to generate an n-multiple image signal, quantization means for quantizing the n-multiple image signal for a pixel of interest, second arithmetic means for multiplying by 1/n an error component generated based on a quantization error generated by quantization to generate a 1/n-multiple error component, storage means for using n pixels as a unit, calculating a sum of 1/n-multiple error components belonging to each unit, and storing the sum in a memory as an error component corresponding to the unit, read means for reading out an error component corresponding to each unit from the memory and outputting the error component for a period of n pixels, and correction means for correcting the n-multiple image signal for the pixel of interest output from the first arithmetic means on the basis of an output from the read means, and supplying the n-multiple image signal to the quantization means.

According to the present invention, there is provided an image processing method of quantizing a multilevel image signal, comprising the quantization step of quantizing a multilevel image signal for a pixel of interest, the compression step of compressing an error component generated based on a quantization error generated by quantization, and storing the compressed error component in a memory, the reconstruction step of reading out the compressed error component from the memory and reconstructing the error component, and the correction step of correcting the multilevel image signal for the pixel of interest referred to in the quantization step on the basis of the reconstructed error component.

According to another aspect of the image processing method of the present invention, there is provided an image processing method of quantizing a multilevel image signal, comprising the first arithmetic step of multiplying a signal value of a multilevel image signal by n (n≧2) to generate an n-multiple image signal, the quantization step of quantizing the n-multiple image signal for a pixel of interest, the second arithmetic step of multiplying by 1/n an error component generated based on a quantization error generated by quantization to generate a 1/n-multiple error component, the storage step of using n pixels as a unit, calculating a sum of 1/n-multiple error components belonging to each unit, and storing the sum in a memory as an error component corresponding to the unit, the read step of reading out an error component corresponding to each unit from the memory and using the error component as an error component for each pixel belonging to the unit, and the correction step of correcting the n-multiple image signal for the pixel of interest generated in the first arithmetic step on the basis of an error component for each pixel generated in the read step, the quantization step comprising the step of quantizing the n-multiple image signal for the pixel of interest corrected in the correction step.

According to the present invention, there is provided a memory medium storing an image processing program for quantizing a multilevel image signal, the image processing program comprising a program code of the quantization step of quantizing a multilevel image signal for a pixel of interest, a program code of the compression step of compressing an error component generated based on a quantization error generated by quantization, and storing the compressed error component in a memory, a program code of the reconstruction step of reading out the compressed error component from the memory and reconstructing the error component, and a program code of the correction step of correcting the multilevel image signal for the pixel of interest referred to in the quantization step on the basis of the reconstructed error component.

According to another aspect of the memory medium of the present invention, there is provided a memory medium storing an image processing program for quantizing a multilevel image signal, the image processing program comprising a program code of the first arithmetic step of multiplying a signal value of a multilevel image signal by n (n≧2) to generate an n-multiple image signal, a program code of the quantization step of quantizing the n-multiple image signal for a pixel of interest, a program code of the second arithmetic step of multiplying by 1/n an error component generated based on a quantization error generated by quantization to generate a 1/n-multiple error component, a program code of the storage step of using n pixels as a unit, calculating a sum of the 1/n-multiple error components belonging to each unit, and storing the sum in a memory as an error component corresponding to the unit, a program code of the read step of reading out an error component corresponding to each unit from the memory and using the error component as an error component for each pixel belonging to the unit, and a program code of the correction step of correcting the n-multiple image signal for the pixel of interest generated in the first arithmetic step on the basis of an error component for each pixel generated in the read step, the program code of the quantization step comprising a program code of quantizing the n-multiple image signal for the pixel of interest corrected by the program code of the correction step.

Further objects, features and advantages of the present invention will become apparent from the following detailed description of embodiments of the present invention with reference to the accompanying drawings.

BRIEF DESCRIPTION OF THE DRAWINGS

FIG. 15 is a view showing an example of operation of the random number generation section described by the C programming language;

FIG. 16 is a view showing an example of operation of a hysteresis controlled valiable calculation section described by the C programming language;

FIG. 17 is a view showing an example of operation of a threshold calculation section described by the C programming language;

FIG. 20 is a view showing processing of correcting a random number RD in an addition variable control section;

FIG. 23 is a view showing an example of operation of a threshold calculation section 305 described by the C programming language in the second embodiment;

DETAILED DESCRIPTION OF THE PREFERRED EMBODIMENTS

An image formation apparatus according to preferred embodiments of the present invention will be described below.

(First Embodiment)

[Schematic Arrangement of Image Formation Apparatus]

Figure 1:
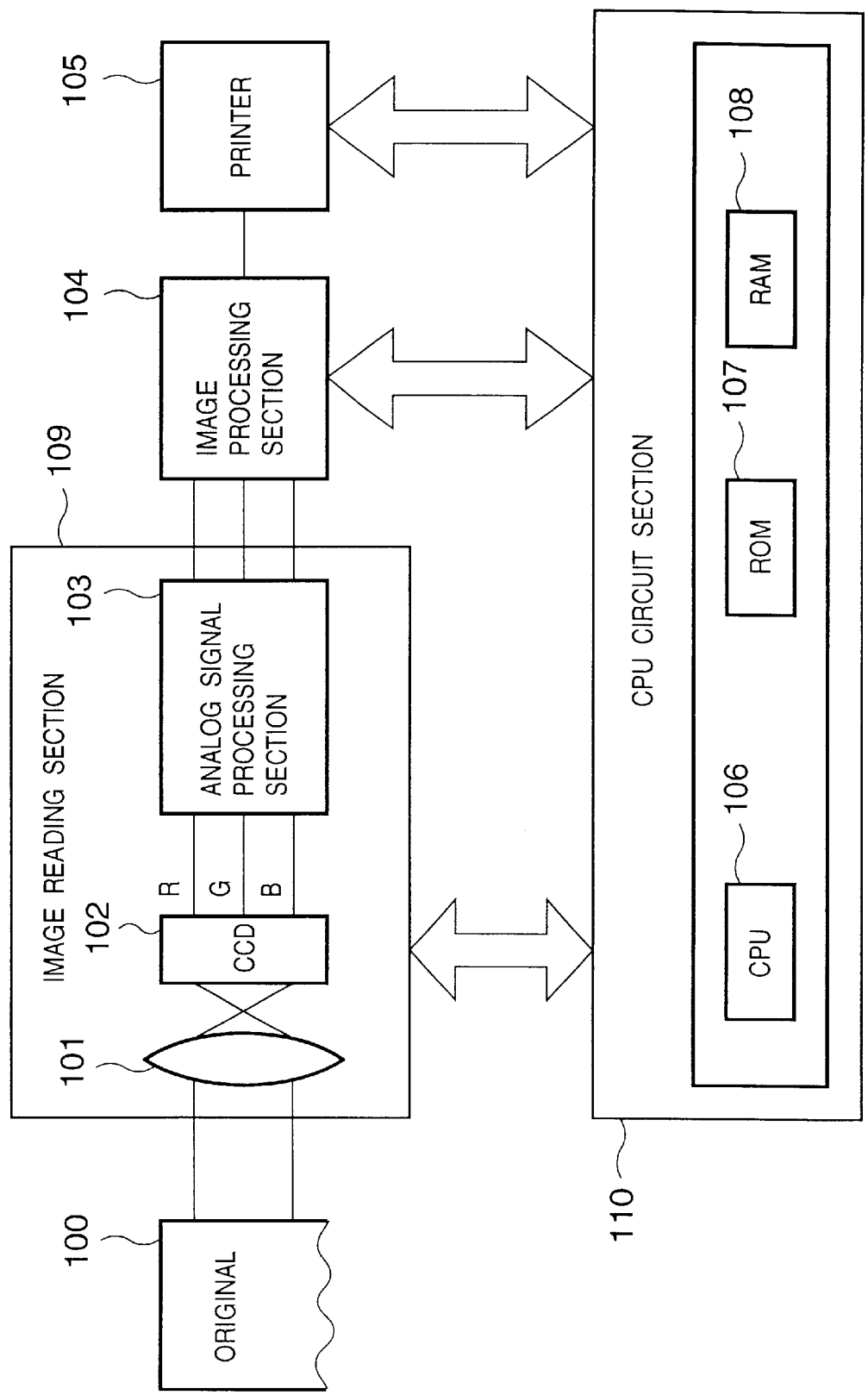
FIG. 1 is a block diagram showing the schematic arrangement of an image formation apparatus according to a preferred embodiment of the present invention.

FIG. 1 is a block diagram showing an image formation apparatus according to preferred embodiments of the present invention.

An image reading section 109 is constituted by a lens 101, CCD sensor 102, analog signal processing section 103, and the like. An original image formed on the CCD sensor 102 via the lens 101 is converted into R (Red), G (Green), and B (Blue) analog electrical signals by the CCD sensor 102. These analog electrical signals are input to the analog signal processing section 103, undergo sample & hold processing, dark level correction, and the like in units of R, G, B colors, and are analog-to-digital-converted (A/D-converted). The resultant R, G, and B digital image signals are supplied to an image processing section 104.

The image processing section 104 performs for the input digital image signals correction processing necessary for the reading system such as shading correction, color correction, and γ correction, processing such as smoothing and edge emphasis, and other processing, and outputs the processed image signals to a printer section 105.

The printer section 105 is constituted by, e.g., an exposure control section (not shown) made up of a laser and the like, an image formation section (not shown), a recording sheet convey control section (not shown), and the like. The printer section 105 records an image on the recording sheet on the basis of the input image signals.

A CPU circuit section 110 is composed of a CPU 106, ROM 107, RAM 108, and the like. The CPU circuit section 110 controls the image reading section 109, image processing section 104, printer section 105, and the like to systematically control operation of the image formation apparatus.

[Image Processing Section]

Figure 2:
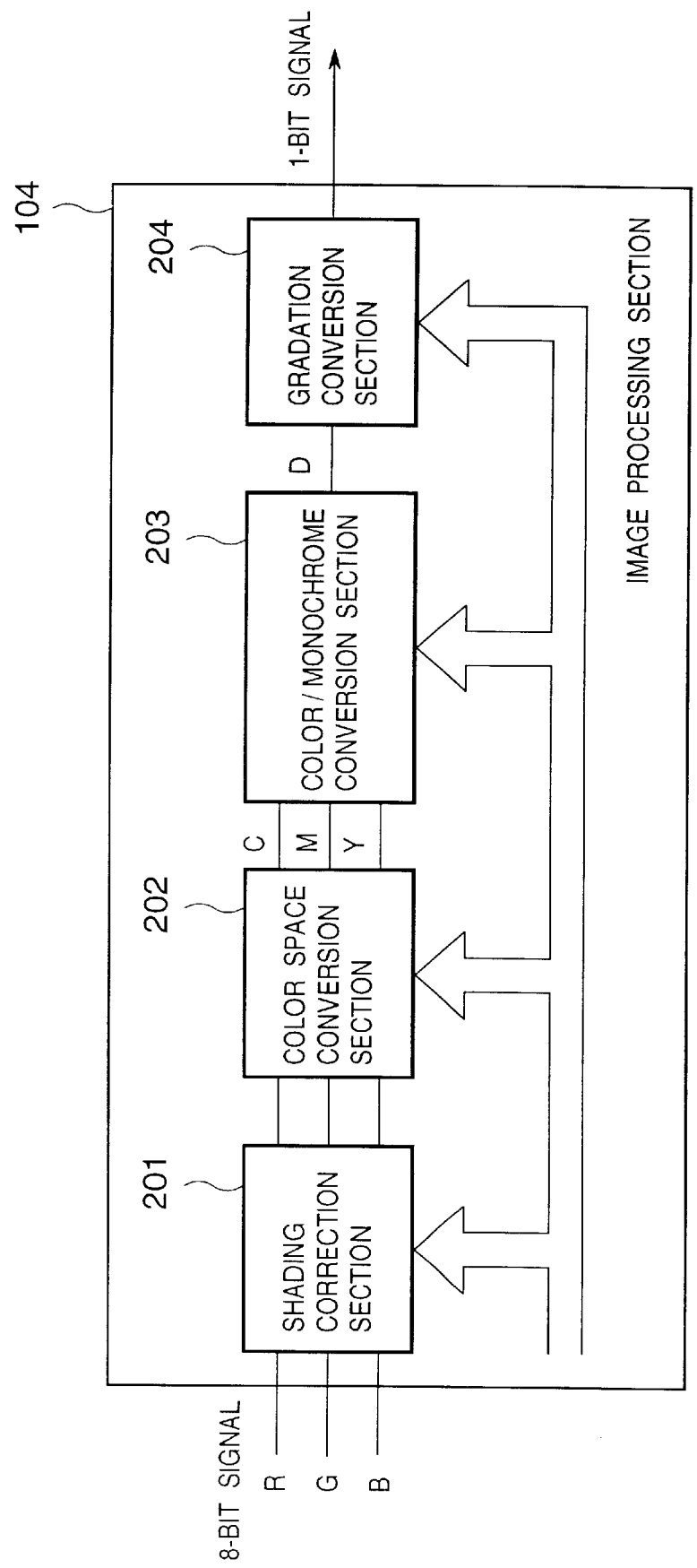
FIG. 2 is a block diagram showing an example of the arrangement of an image processing section.

FIG. 2 is a block diagram showing an example of the arrangement of the image processing section 104. Digital image signals input from the analog signal processing section 103 are input to a shading correction section 201. The shading correction section 201 corrects variations in the CCD sensor 102 and the luminous intensity distribution characteristics of an original illumination lamp, and supplies the corrected image signals (luminance signals) to a color space conversion section 202.

The color space conversion section 202 converts the input luminance signals (R, B, and B) into density signals (C, M, and Y) and supplies them to a color/monochrome conversion section 203. The color/monochrome conversion section 203 converts the C, M, and Y color image signals into monochrome signals and supplies them to a gradation conversion section 204.

The gradation conversion section 204 executes error diffusion processing or ordered dithering processing in order to convert the input image signals into image signals of pseudo halftone expression.

[Gradation Conversion Section]

Figure 3:
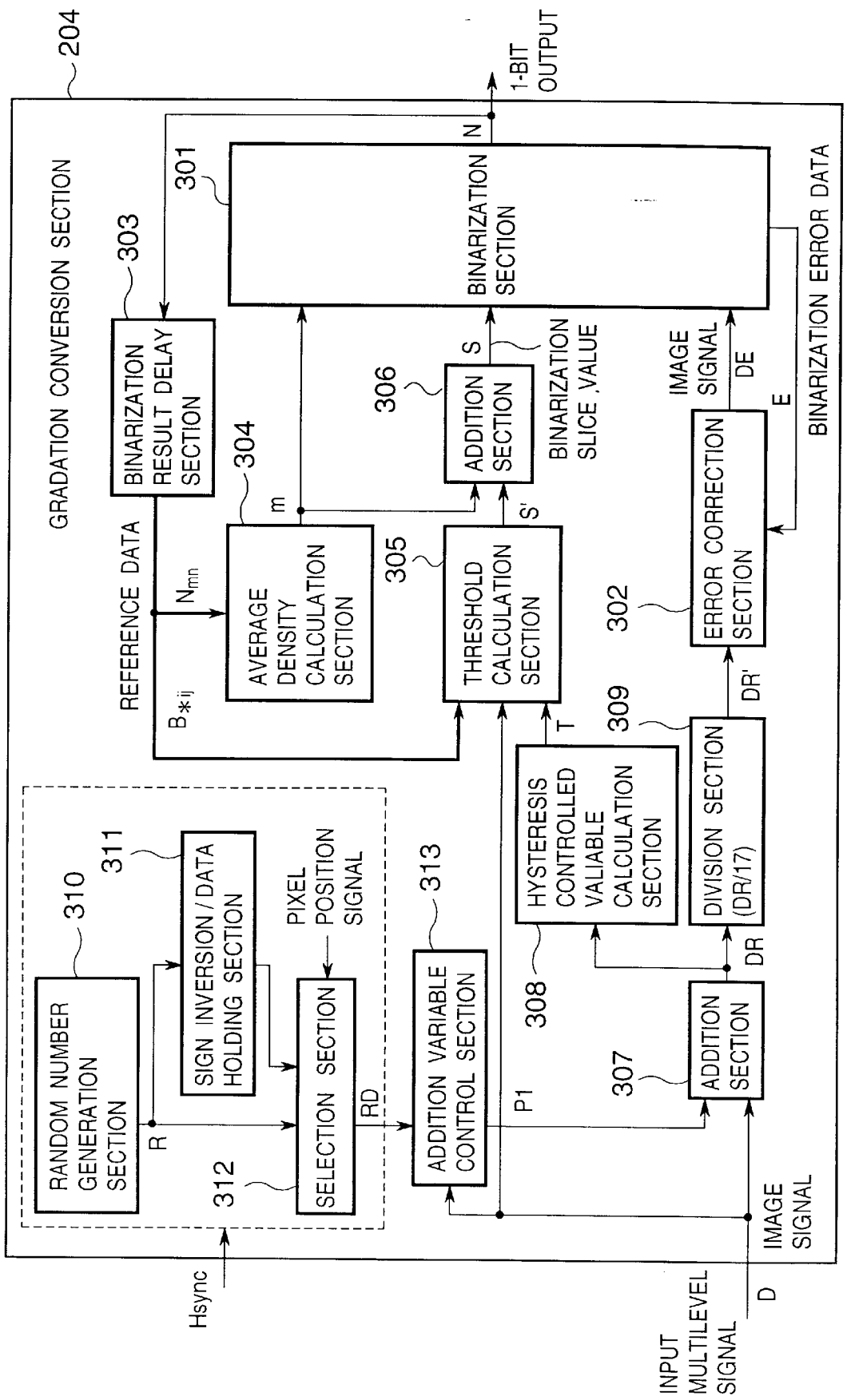
FIG. 3 is a block diagram showing an example of the arrangement of a gradation conversion section.

FIG. 3 is a block diagram showing an example of the arrangement of the gradation conversion section 204. Note that the gradation conversion section 204 shown in FIG. 3 executes binary ordered dithering processing capable of texture control but may convert input an image signals into an image signal of pseudo halftone expression by another method.

An error correction section 302 receives an image signal DR' obtained by adding a random number to a multilevel image signal D supplied from the color/monochrome conversion section 203 and dividing the sum by a constant (17), and binarization error data (quantization error data) E generated in a binarization section 301.

The error correction section 302 performs error correction for the binarization error data E in units of n pixels, and supplies an image signal DE added with the corrected data E to the binarization section 301.

The binarization section 301 receives the image signal DE, a binarization slice value S, and an average density m, and compares the image signal DE with the binarization slice value S to generate and output a binary image signal N in accordance with their magnitude relationship. The binarization section 301 calculates the difference between the image signal DE and average density calculation value m and outputs the difference as binarization error data E.

A binarization result delay section 303 receives and delays the binary image signal N to generate reference data Nmn and B*ij made from binarization results of pixels in a predetermined area, and supplies the reference data Nmn and B*ij to an average density calculation section 304 and threshold calculation section 305, respectively.

The average density calculation section 304 receives the reference data Nmn, perform product-sum operation for a predetermined coefficient and the reference data Nmn to calculate the average density m, and supplies the average density m to an addition section 306 and binarization section 301.

The threshold calculation section 305 receives the reference data B*ij supplied from the binarization result delay section 303, the input multilevel image signal D, and an output T from a hysteresis controlled valiable calculation section 308, calculates the threshold controlled variable in an arbitrary area in accordance with the reference data B*ij representing a past binarization state (pattern), and supplies the threshold controlled variable as a binarization slice value S' to the addition section 306.

The addition section 306 receives and adds the average density m output from the average density calculation section 304 and the binarization slice value S' output from the threshold calculation section 305, and supplies the sum as a binarization slice value S to the binarization section 301.

An addition section 307 adds the input multilevel image signal D and a random number P1 supplied from an addition variable control section 313, and supplies the sum as an image signal DR to the hysteresis controlled valiable calculation section 308 and division section 309.

The hysteresis controlled valiable calculation section 308 calculates a hysteresis controlled variable T based on the image signal DR output from the addition section 307, and supplies the variable T to the threshold calculation section 305.

The division section 309 divides the image signal DR output from the addition section 307 by the constant (17) and supplies the quotient as an image signal DR' to the error correction section 302. At this time, the remainder is dropped by rounding.

A random number generation section 310 generates a random number R of an m series from −17 to +17 and supplies it to a selection section 312 and sign inversion/data holding section 311.

The sign inversion/data holding section 311 inverts the sign of the random number R, and after holding the random number R for a predetermined pixel period, supplies it to the selection section 312.

The selection section 312 selectively supplies to the addition variable control section 313 the random number R supplied from the random number generation section 310 and the random number supplied from the sign inversion/data holding section 311 in accordance with a pixel position signal (to be described below).

The addition variable control section 313 determines the value of a random number P1 to be output in accordance with the multilevel image signal D.

The respective sections of the gradation conversion section 204 shown in FIG. 3 will be explained in detail.

Figure 5:
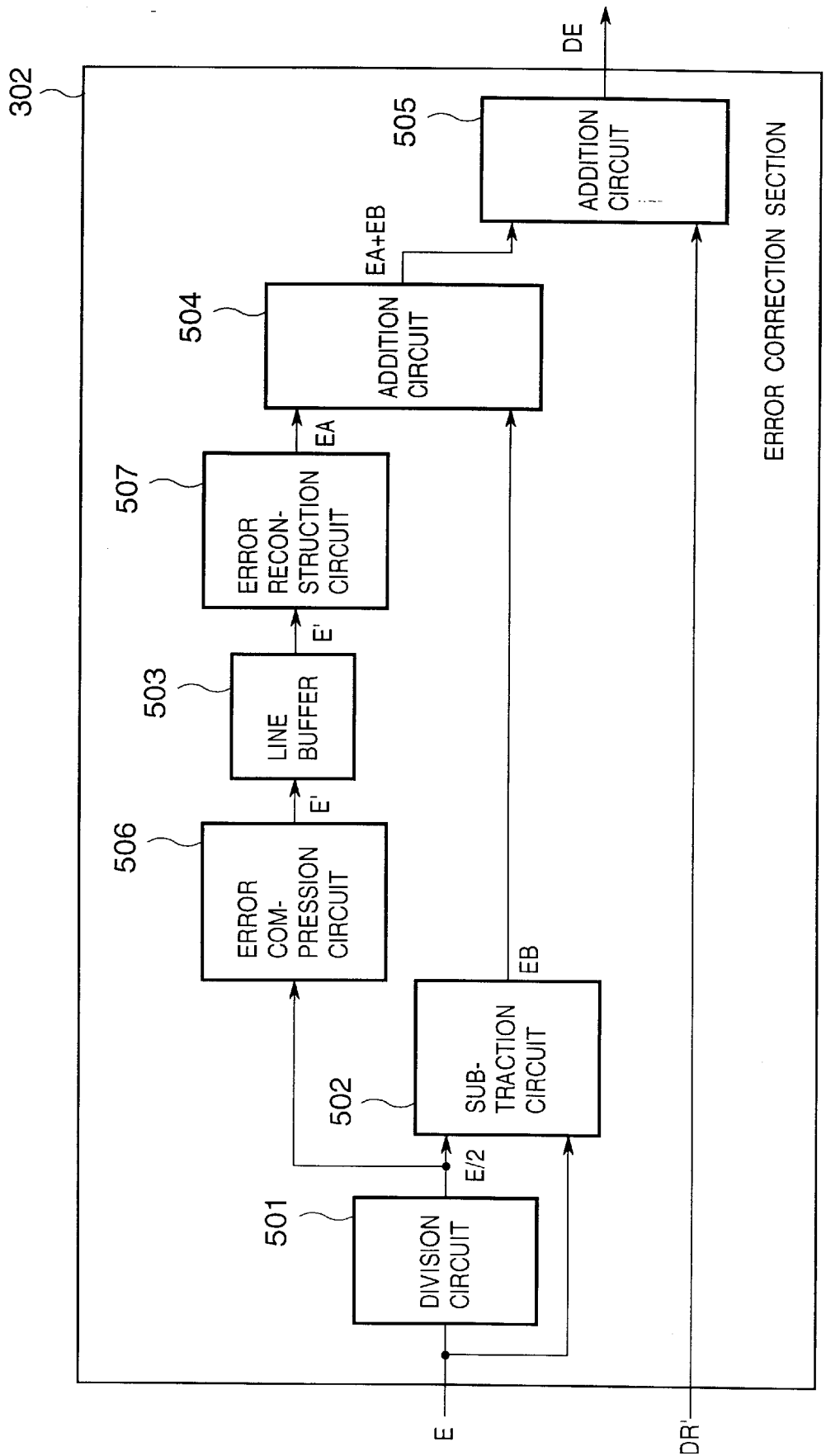
FIG. 5 is a block diagram showing an example of the arrangement of an error correction section.

FIG. 5 is a block diagram showing an example of the arrangement of the error correction section 302 of the gradation conversion section 204 shown in FIG. 3. The error correction section 302 receives the image signal DR' and binarization error data E, generates an image signal DE obtained by adding an error component to the image signal DR', and supplies the image signal DE to the binarization section 301.

The binarization error data E is limited to a value from "−6 to +6" by limiter processing by a circuit (not shown) so as to avoid the influence of past binarization (n-level) quantization results called "false edge" when the input multilevel image signal D abruptly changes from a high density to a low density.

The binarization error data E limited to the value from "−6 to +6" is halved by a division circuit 501. The result (E/2) is supplied to a subtraction circuit 502 and error compression circuit 506.

Figure 7:
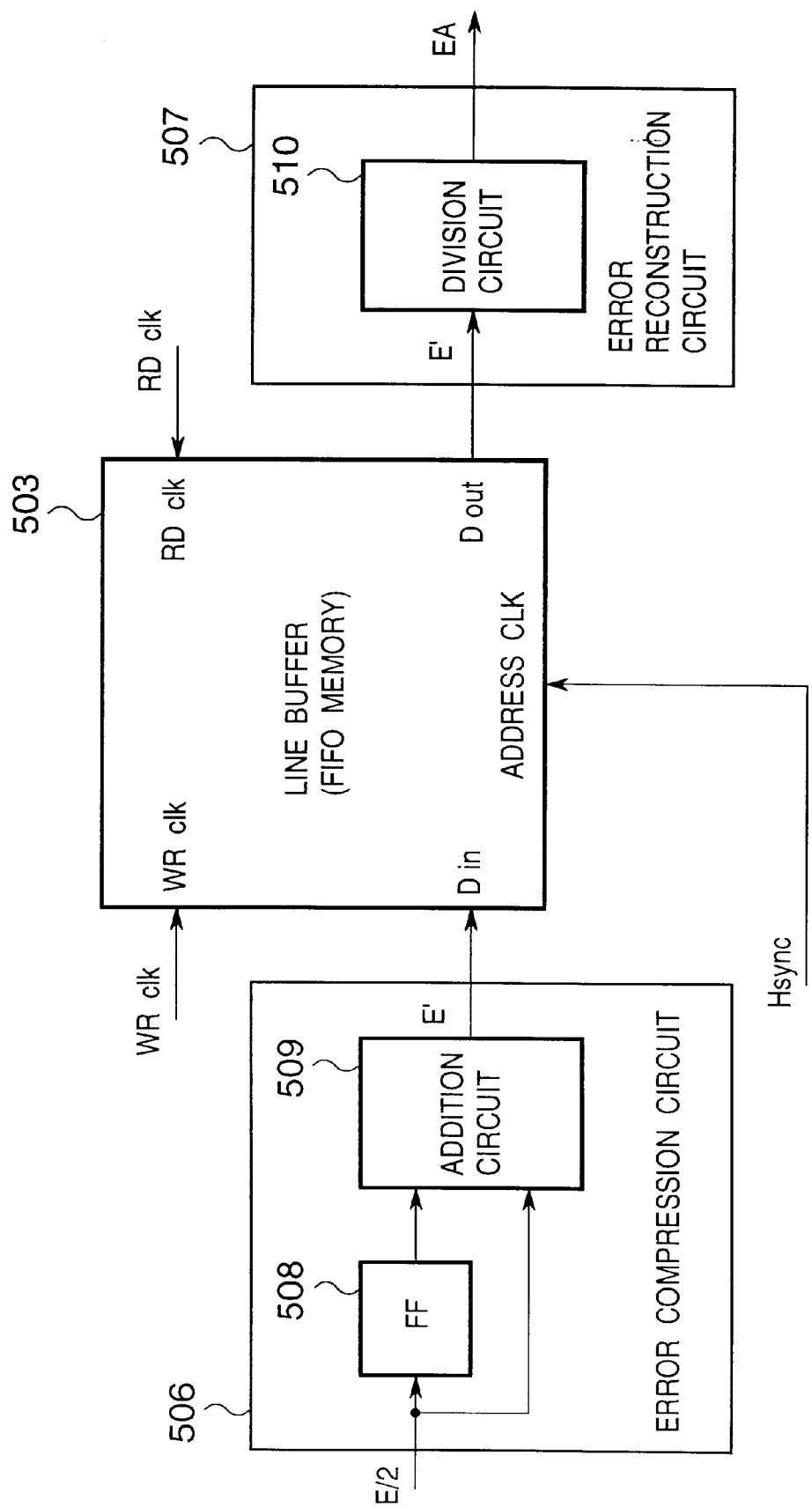
FIG. 7 is a block diagram showing part of the error correction section in detail.
Figure 8:
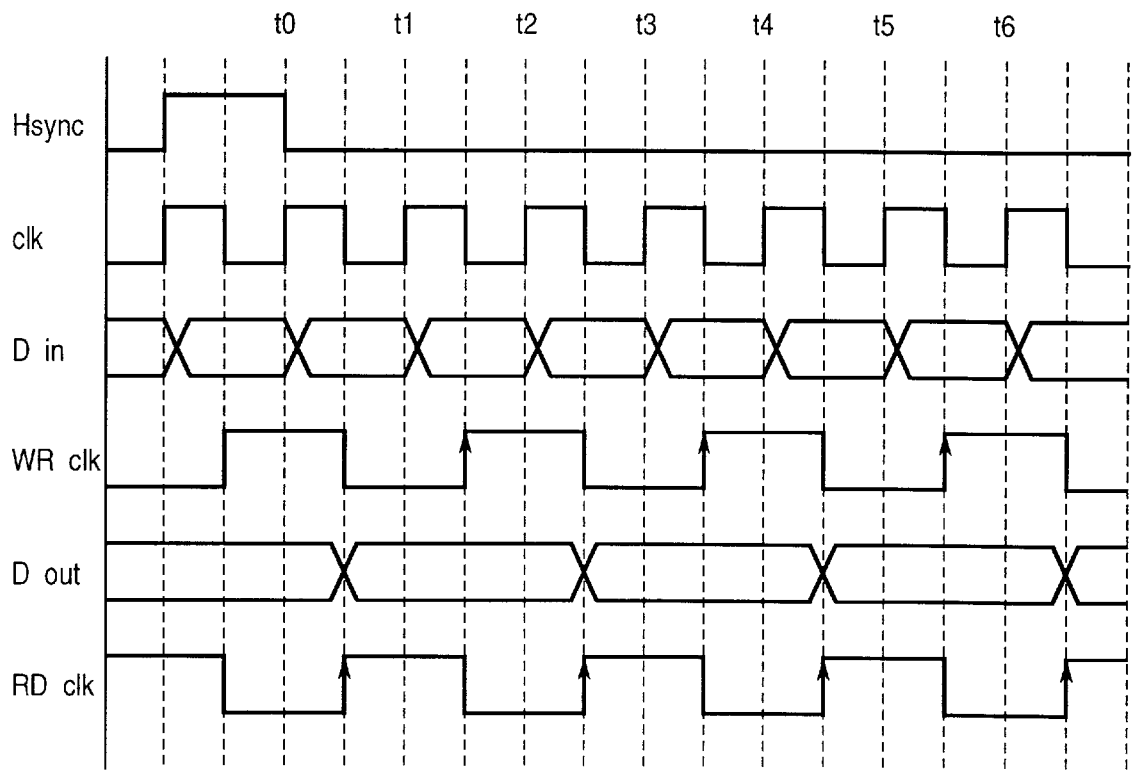
FIG. 8 is a timing chart showing operation of a line buffer.

FIG. 7 is a block diagram showing part of the arrangement in FIG. 5 in detail. The error compression circuit 506 adds the error component (E/2) in units of two pixels and supplies the sum (E') to a line buffer 503. More specifically, the error compression circuit 506 adds an error component (E/2) delayed by one pixel period (one period clk) by an FF (flip-flop) and an error component (E/2) directly input from the division circuit 501, and supplies the sum E' to the line buffer 503. The sum E' (=Din) is written in the line buffer 503 in accordance with a write clock signal WRclk, as shown in FIG. 8.

In other words, the error compression circuit 506 adds two each of error components (E/2) input at timings t0, t1, t2, t3, t4, t5, t6, t7, t8, t9, t10, t11, . . . in units of "t0, t1", "t2, t3", "t4, t5", . . . . The sums E' are written in the line buffer 503 at timings delayed by a predetermined time from the timings t1, t3, t5, t7, t9, t11, . . . .

Figure 9:
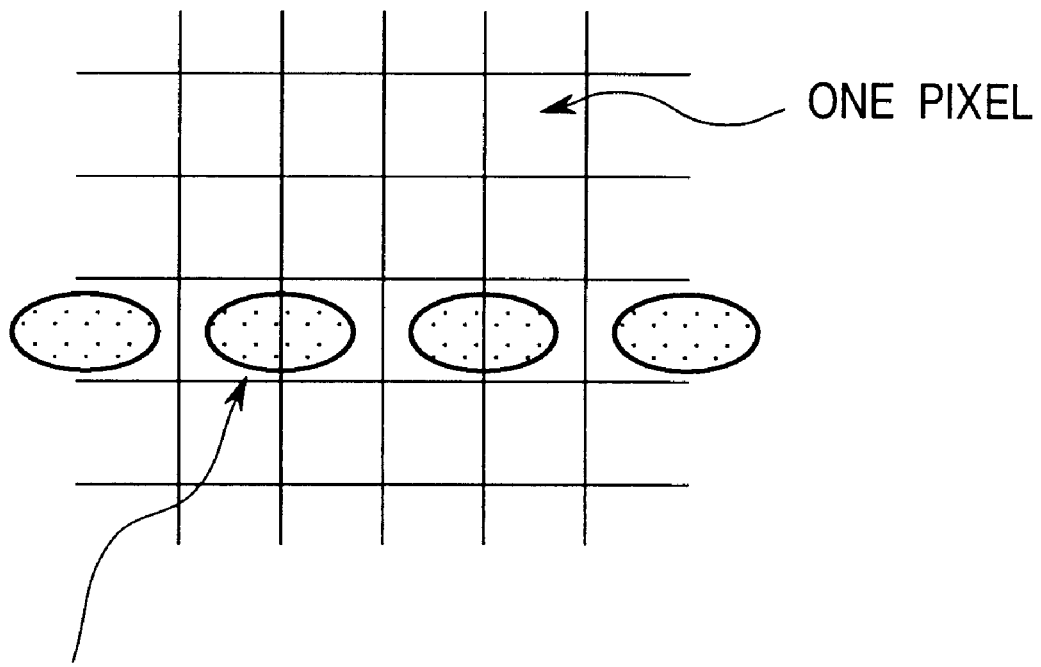
FIG. 9 is a conceptual view showing processing by an error compression circuit.

FIG. 9 is a conceptual view showing processing by the error compression circuit 506. In an example of the prior art described above, a line memory for 3 bits per pixel is required to hold a quantization error value falling within the range of ±3. To the contrary, the first embodiment holds a quantization error in units of two pixels, and thus only holds a quantization error falling within the range of ±6 per two pixels in holding a quantization error corresponding to the range of ±3 per pixel. According to the first embodiment, therefore, a line memory can be constructed from 4 bits per two pixels, i.e., 2 bits per one pixel because a value falling within the range of −8 to +7 can be expressed by 4 bits.

As a result, the first embodiment can reduce the capacity of the line buffer (the total number of bits) to ⅔ compared to the prior art, and can halve the number of line buffer stages (e.g., the number of FOFO stages). Reduction in the capacity of the line buffer and the number of line buffer stages reduces the cost of whole apparatus.

For example, to process an image at a resolution of 600 dpi, an example of the prior art requires a 7,200-pixel (7,200-stage) line buffer for 3 bits per pixel, but the first embodiment satisfactorily comprises a 3,600-pixel (3,600-stage) line buffer for 2 bits per pixel (4 bits per two pixels). Hence, the capacity of the line buffer can be reduced, the arrangement of the line buffer (e.g., the arrangement of the control section) can be simplified, and the cost can be reduced.

The sum E' written in the line buffer 503 is delayed by one line, read out in accordance with a read clock RDclk, as shown in FIG. 8, and supplied to an error reconstruction circuit 507. The error reconstruction circuit 507 divides the sum E' (=Dout) supplied from the line buffer 503 by 2 to generate an error component EA (=E'/2) and supply it to the addition circuit 504. The sum E' supplied from the line buffer 503 is divided by 2 to generate the error component EA (=E'/2) (i.e., to reconstruct the quantization error E/2) in the error reconstruction circuit 507 because two pixels are used as a unit and quantization errors E/2 belonging to each unit are added (e.g., E/2 at t0 and E/2 at t1 are added) to compress the error component (E/2) in the error compression circuit 506.

If the error components of the quantization error are compressed and reconstructed in this way, the reconstructed error components have the same values between error components belonging to each unit made from two pixels. This processing hardly deteriorates the image quality.

The addition circuit 504 adds the error component EA supplied from the error reconstruction circuit 507 (quantization error distributed from a pixel one line before a pixel of interest) and the error component EB supplied from the subtraction circuit 502 (quantization error distributed from a pixel one before the pixel of interest), and supplies the sum (EA+EB) to the addition circuit 505. The addition circuit 505 adds the error component sum (EA+EB) and the image signal DR' and supplies the sum as an image signal DE to the binarization section 301.

Figure 6:
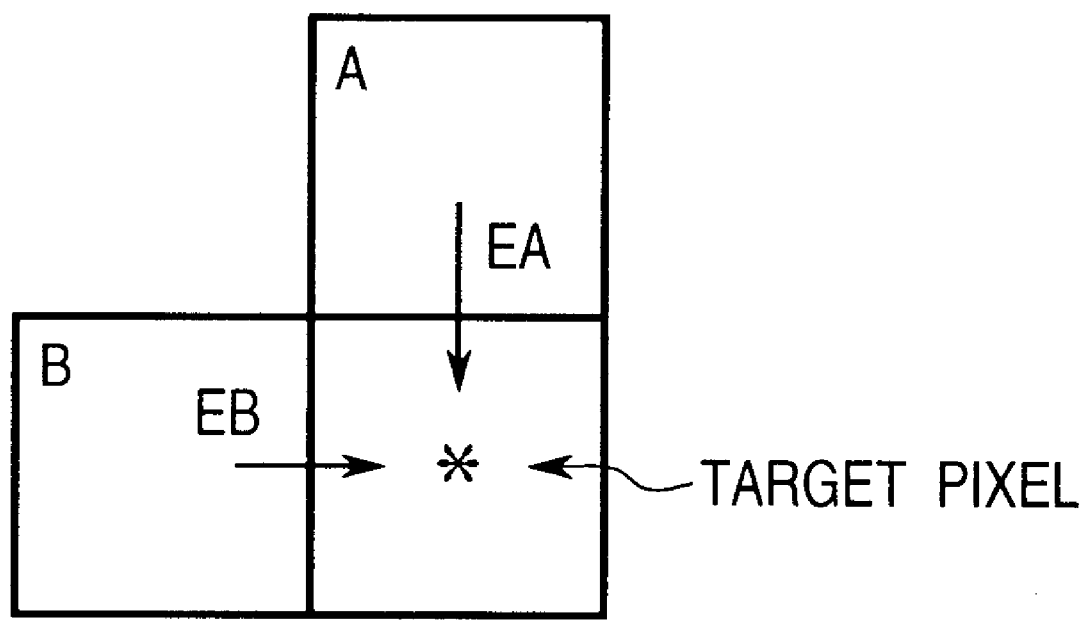
FIG. 6 is a view showing processing of adding the error component of a quantization error to a pixel of interest.

Consequently, as shown in FIG. 6, the error correction section 302 adds to the pixel of interest the error component EA of a binarization error generated when a pixel A one line before is binarized, and the error component EB of a binarization error generated when a pixel B before one pixel is binarized.

Figure 4:
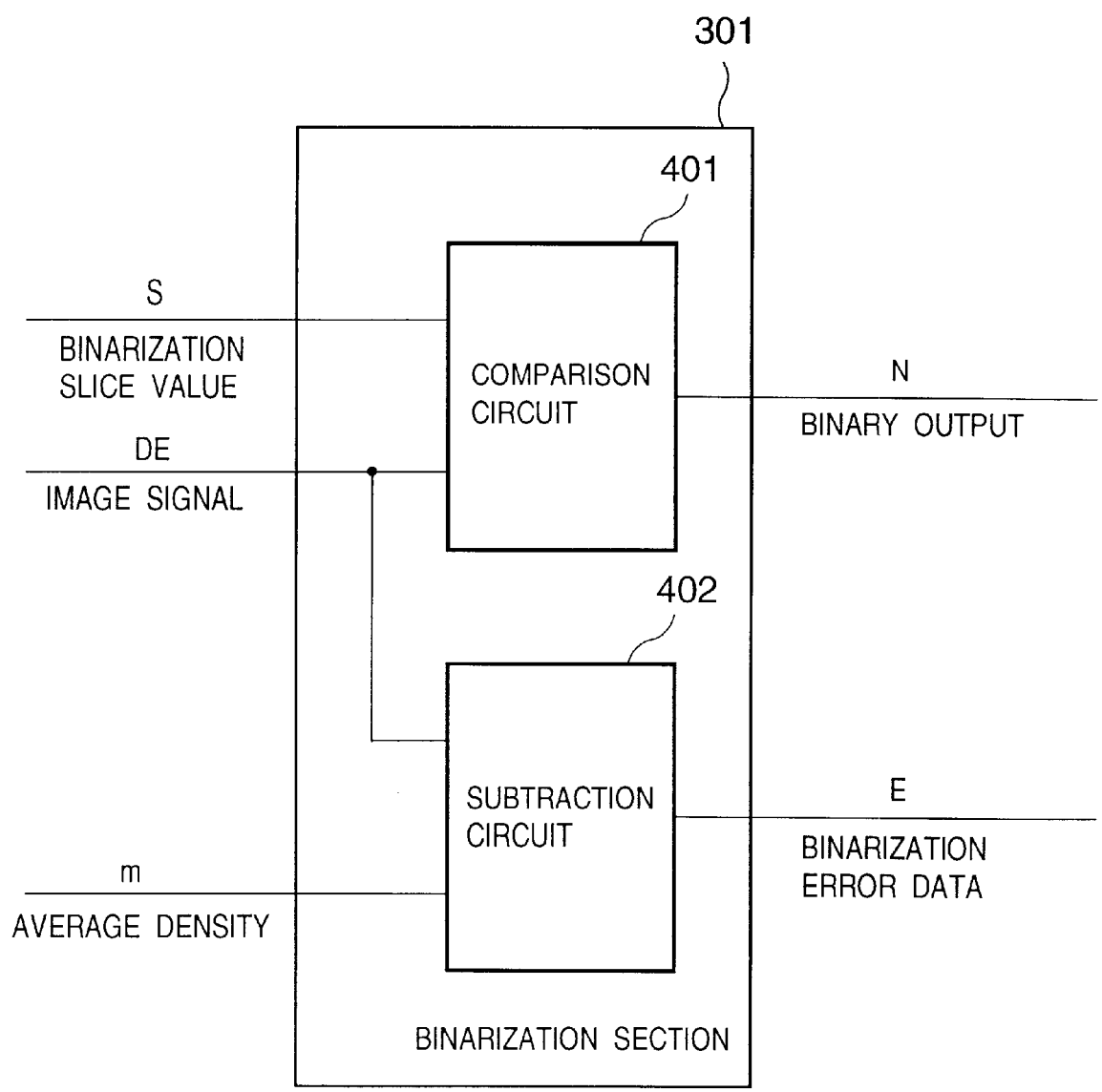
FIG. 4 is a block diagram showing an example of the arrangement of a binarization section.

FIG. 4 is a block diagram showing an example of the arrangement of the binarization section 301. The binarization section 301 receives the image signal DE, binarization slice value S, and average density m, compares the image signal DE and binarization slice value S to generate a binary image signal N, and compares the image signal DE and average density m to generate binarization error data E.

A comparison circuit 401 receives and compares the image signal DE and binarization slice value S to output a binary image signal N which satisfies For DE>S, N=1
For DE=S, N=0

A subtraction circuit 402 receives the average density m and image signal DE to output binarization error data E (=m−DE). The subtraction circuit 402 performs limitter processing so as to make the value E fall within the range of "−6 to +6".

Figure 10:
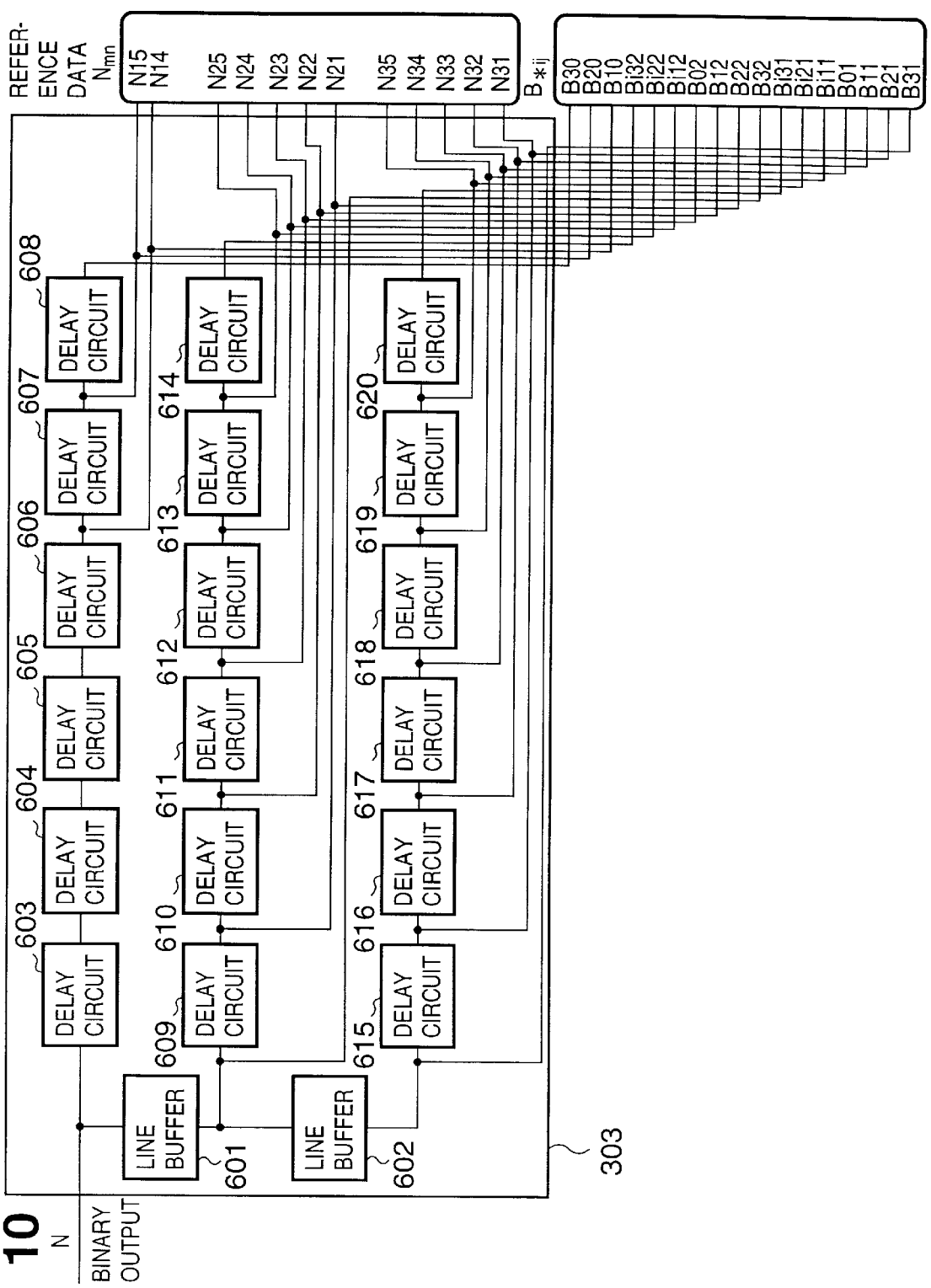
FIG. 10 is a block diagram showing an example of the arrangement of a binarization result delay section.

FIG. 10 is a block diagram showing an example of the arrangement of the binarization result delay section 303. The binarization result delay section 303 receives and delays the binary image signal N to generate reference data Nmn and B*ij made from the binarization results of pixels in a predetermined area, and supplies the reference data Nmn and B*ij to the average density calculation section 304 and threshold calculation section 305, respectively.

The binary image signal N is delayed by one line by a 1-bit one-line buffer 601, and further by one line by a 1-bit one-line buffer 602.

The binary image signal N is sequentially delayed by one pixel by each of 1-pixel delay circuits 603 to 608. The delay circuits 606 and 607 respectively output delayed data N14 and N15. In addition, the delay circuits 606, 607, and 608 respectively output delayed data B10, B20, and B30.

An output from the line buffer 601 is sequentially delayed by one pixel by each of 1-pixel delay circuits 609 to 614. The delay circuits 609 to 614 respectively output delayed data N21 to N25. The line buffer 601 and delay circuits 609 to 614 respectively output delayed data B32, B22, B12, B02, Bi12, Bi22, and Bi32.

An output from the line buffer 602 is sequentially delayed by one pixel by each of 1-pixel delay circuits 615 to 620. The delay circuits 615 to 619 respectively output delayed data N31 to N35. The line buffer 602 and delay circuits 615 to 620 respectively output delayed data B31, B21, B11, B01, Bi11, Bi21, and Bi31.

Figure 11:
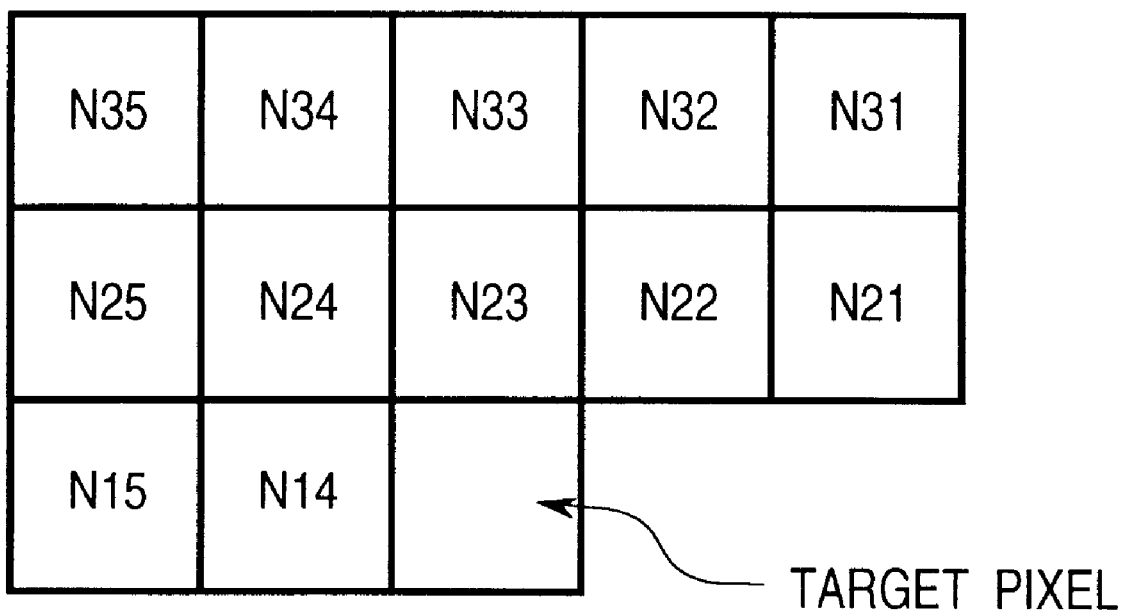
FIG. 11 is a view showing the relationship between reference data Nmn and the pixel of interest.

The delayed data N14, N15, N21, N22, N23, N24, N25, N31, N32, N33, N34, and N35 form the reference data Nmn. FIG. 11 is a view showing the relationship between the reference data Nmn and pixel of interest.

Figure 18:
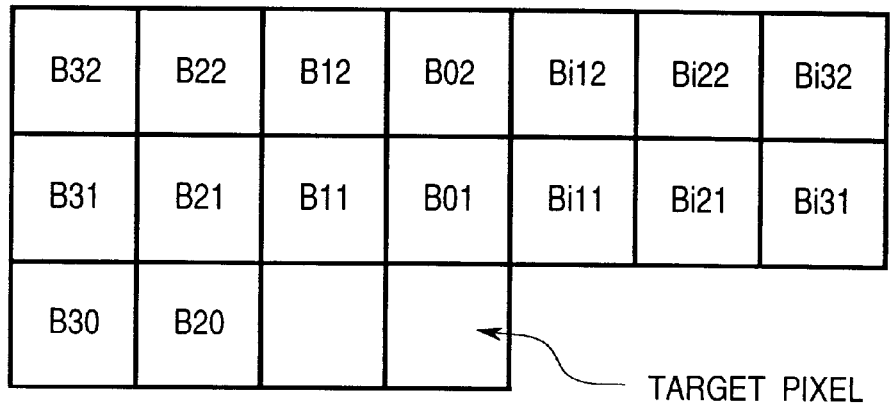
FIG. 18 is a view showing the relationship between reference data B*ij and the pixel of interest.

The delayed data B10, B20, B30, Bi12, Bi22, Bi32, B02, B12, B22, B32, Bi11, Bi21, Bi31, B01, Bi1, B21, and B31 form the reference data B*ij. FIG. 18 is a view showing the relationship between the reference data B*ij and pixel of interest.

Figure 12:
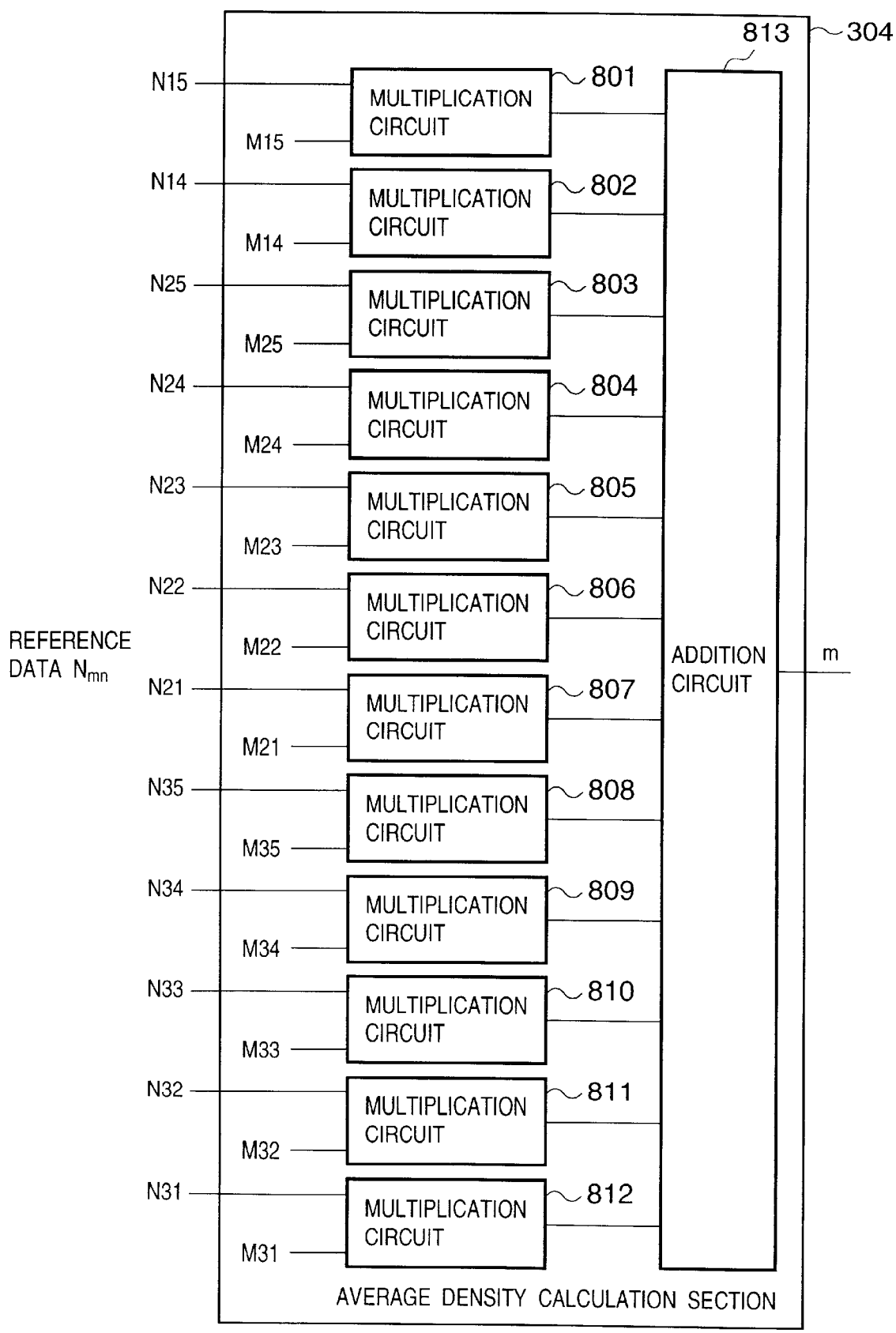
FIG. 12 is a block diagram showing an example of the arrangement of an average density calculation section.

FIG. 12 is a block diagram showing an example of the arrangement of the average density calculation section 304. The average density calculation section 304 performs product-sum operation for the reference data Nmn and a predetermined coefficient Mmn to calculate the average density m, and supplies it to the binarization section 301 and addition section 306.

Figure 13:
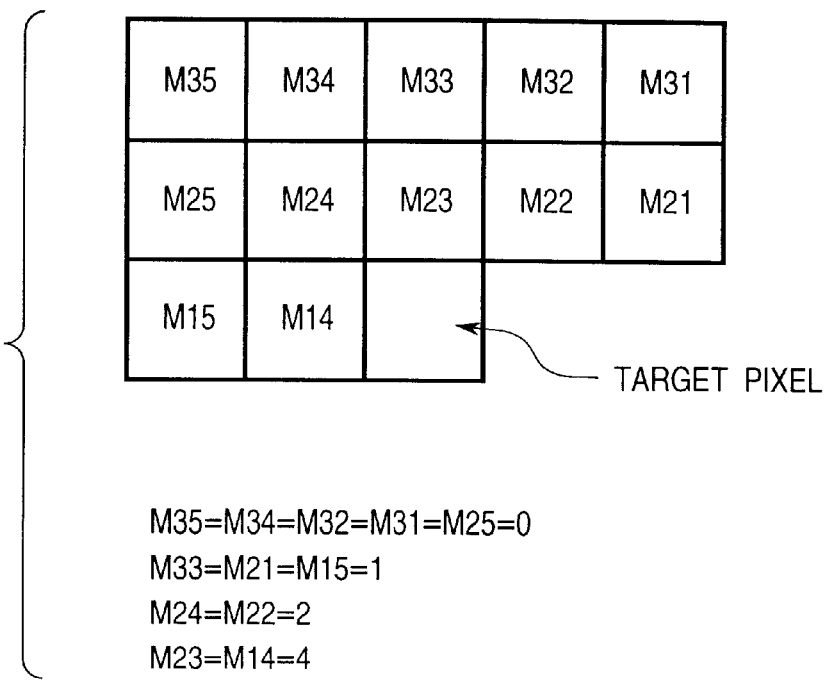
FIG. 13 is a view showing an example of a coefficient Mmn.

More specifically, a multiplication circuit 801 receives a binary signal (delayed data) N15 and a coefficient M15 to output the product. Similarly, multiplication circuits 802 to 812 multiply binary signals (delayed data) N14, N25, N24, N23, N22, N21, N35, N34, N33, N32, and N31 and coefficients M14, M25, M24, M23, M22, M21, M35, M34, M33, M32, and M31 to output the products. An addition circuit 813 adds the products supplied from the multiplication circuits 801 to 812 to output the sum as an average density m. FIG. 13 is a view showing an example of the coefficient Mmn.

FIG. 17 is a view showing an example of operation of the threshold calculation section 305. The threshold calculation section 305 receives the reference data B*ij supplied from the binarization result delay section 303, the multilevel image data D, and the controlled variable T supplied from the hysteresis controlled valiable calculation section 308, calculates a threshold controlled variable in an arbitrary area in accordance with the reference data B*ij as a past binarization state (pattern), and outputs the threshold controlled variable as a binarization slice value S'.

The threshold calculation section 305 first divides the value of the controlled variable T supplied from the hysteresis controlled valiable calculation section 308 by constants LT1 (=2), LT2 (=4), LT3 (=8), and LT4 (=16) to obtain variables A (=T/LT1), B (=T/LT2), C (=T/LT3), and D (=T/LT4) to be used inside.

The threshold calculation section 305 determines the value of the binarization slice value S' using the variables A, B, C, and D by the following method in accordance with the layout (pattern) of binarization results given by reference data B'*ij supplied from the binarization result delay section 303. FIG. 18 is a view showing the layout (pattern) of binarization results given by the reference data B'*ij. The first embodiment does not refer to the pixel one pixel before the pixel of interest in order to realize high-speed processing.

A processing flow of determining the binarization slice value S' will be described with reference to FIG. 17. In the following description, "&&" means the AND.

When the binarization state around the pixel of interest is B32==0 && B22==1 && B12==0 && B21==0 && B11==1 && B01==0 or Bi12==0 && Bi22==1 && Bi32==0 && B01==0 && Bi11==1 && Bi21==0, the binarization slice value S' is forcibly set to the maximum constant of 15 and output in order to forcibly make it less probable that dots are printed when the binarization state satisfies this condition.

Also when the binarization state around the pixel of interest is B12==0 && B02==0 && Bi12==0 && Bi22==0 && Bi32==0 && B11==0 && B01==0 && Bi11==1 && Bi21==0 && Bi31==0 && B20==0 and the image data D (in this case, D=0 to 255) is smaller than a reference value (in this case, 31), the binarization slice value S' is forcibly set to the maximum constant of 15 and output in order to forcibly make it less probable that dots are printed when the binarization state satisfies this condition.

To the contrary, when the binarization state around the pixel of interest is B12==0 && B02==0 && Bi12==0 && Bi22==0 && Bi32==0 && B11==0 && B01==0 && Bi11==1 && Bi21==0 && Bi31==0 && B20==0 and the input multilevel data D is equal to or larger than the reference value (in this case, 31), the binarization slice value S' is set to a calculated average density value of 0 and output in order not to perform texture control when past binarization results form a specific layout (pattern).

The reference value is not limited to 31 and can be set to another value (e.g., 48 or 64). Note that a larger reference value applies strong texture control, and a smaller reference value applies weak texture control.

When the binarization state around the pixel of interest is B02==0 && Bi12 ==0 && B11==0 && B01==1 && Bi11==1 && Bi21==0 && B20==0, the binarization slice value S' is set to −A and output in order to make it more probable that dots are printed when the binarization state satisfies this condition.

The value of the binarization slice value S' is similarly determined in accordance with the pattern of binarization results.

By this processing, the binarization slice value S' is determined to make it more probable that dots are printed for a positive hysteresis controlled variable T or to make it less probable that dots are printed for a negative hysteresis controlled variable T.

The above processing is sequentially executed for the respective pixels to determine the texture in an arbitrary density area in accordance with the value of the hysteresis controlled variable T with an arbitrary shape in accordance with the value of the reference data B*ij.

Figure 19:
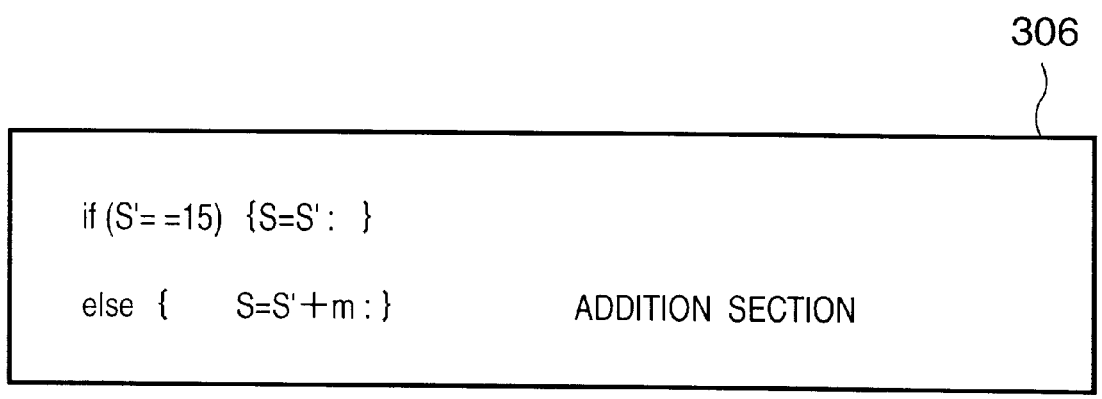
FIG. 19 is a view showing an example of operation of an addition section (306) described by the C programming language.

The binarization slice value S' is supplied to the addition section 306 where the value S' is added to the average density m output from the average density calculation section 304. As shown in FIG. 19, for a binarization slice value S' of 15, the addition section 306 outputs 15 as the binarization slice value S, and otherwise a value S'+m.

The addition section 307 adds the random number P1, image signal D, and constant (8). This is because the divisor used to divide the signal value of the image signal DR by the division section 309 is 17, the maximum remainder of division for the value of the image signal DR is 16, and the amplitude of a random number (random number P1+constant (8)) added to the image signal D must be set to an even number of 16 or more. More specifically, the constant (8) is determined by calculation of 16/2. The addition section 307 adds the constant (8) as a bias component to the image signal D.

Note that the addition section 307 comprises a limiter circuit for making the sum (image signal DR) fall within the range of 0 to 255. The image signal DR output from the addition section 307 is supplied to the division section 309 and hysteresis controlled valiable calculation section 308.

The division section 309 divides the value of the image signal DR by the constant (17) and supplies the quotient as an image signal DR' to the error correction section 302. Note that the remainder is dropped by rounding.

FIG. 16 is a view showing an example of operation of the hysteresis controlled variable calculation section 308. The hysteresis controlled valiable calculation section 308 determines a hysteresis controlled variable T'_ in accordance with the image signal DR and supplies it to the threshold calculation section 305 in order to adjust the hysteresis variable in an arbitrary density area. Accordingly, texture control can be done in an arbitrary density area.

Operation of the hysteresis controlled valiable calculation section 308 will be explained with reference to FIG. 16. In FIG. 16, operation of the hysteresis controlled valiable calculation section 308 is described by the C programming language for descriptive convenience.

If the value of the image signal DR is equal to or smaller than the constant LR1 (=16), a variable II is set to 0. If the value of the image signal DR is larger than the constant LR1 and equal to or smaller than a constant LR2 (=48), the variable II is calculated from $$II=((DR-LR1) \times (ALF \times 256/(LR2-LR1)))/256$$

In this case, as the value of the image signal DR increases from the constant LR1 to the constant LR2, the value of the variable II increases close to the constant ALF (=32) from 0.

If the image signal DR is larger than the constant LR2 and equal to or smaller than a constant LR3 (=233), the variable II is set to the constant ALF.

If the image signal DR is larger than the constant LR3 and equal to or smaller than a constant LR4 (=255), the variable II is calculated from $$II=ALF-((DR-LR3) \times (ALF \times 256/(LR4-LR3)))/256$$

In this case, as the value of the image signal DR increases from the constant LR3 to the constant LR4, the value of the variable II increases close to 0 from the constant ALF.

If the image signal DR is larger than the constant LR4, the variable is set to 0.

After the value of the variable II is determined, a constant ALFm (=16) is subtracted from the variable II to determine and output a controlled variable T. This subtraction is done to change the controlled variable T from a negative value to a positive value. This allows texture control in an arbitrary density area within a wide latitude.

Figure 14:
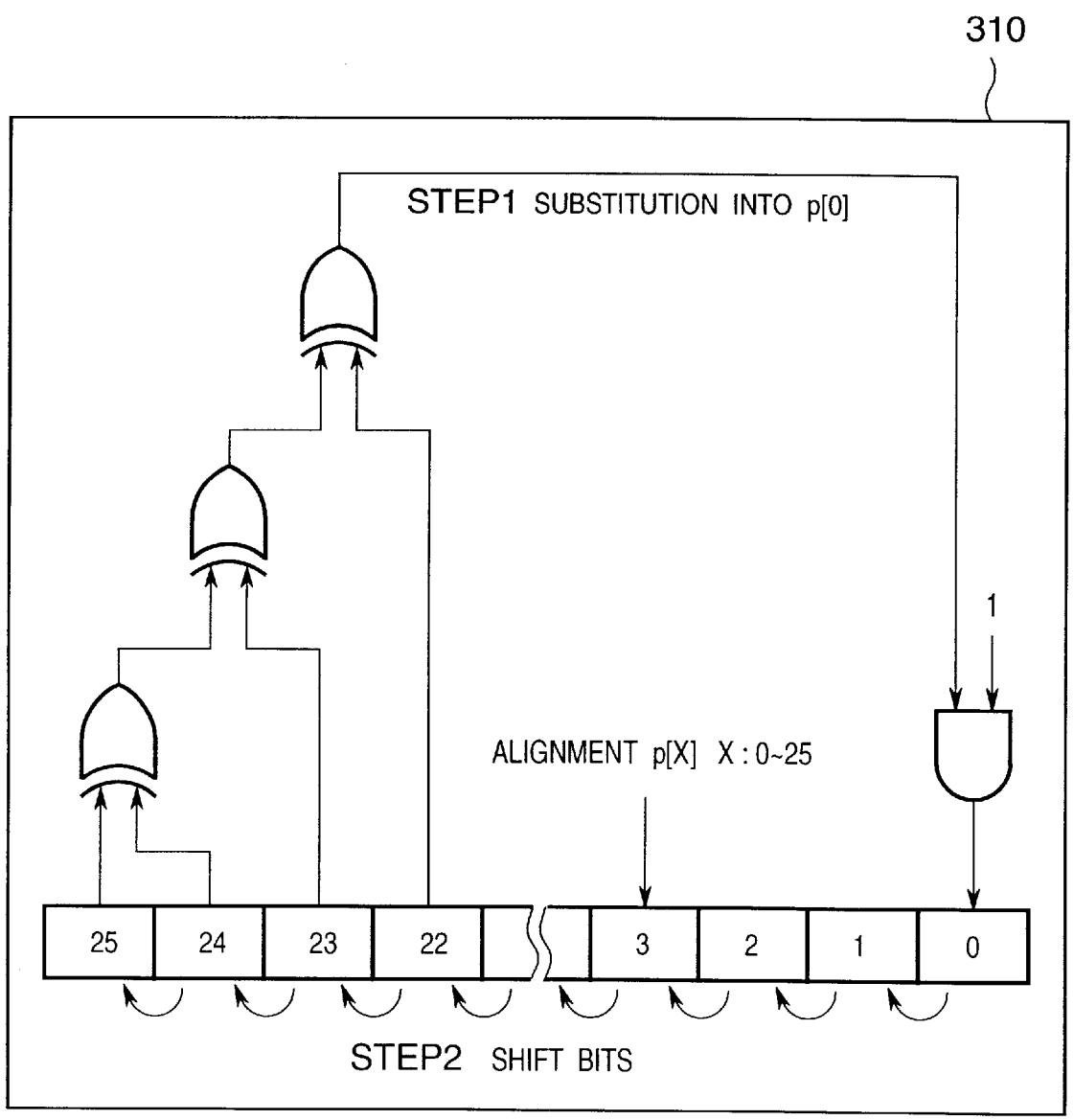
FIG. 14 is a conceptual view schematically showing an example of the arrangement of a random number generation section.

FIG. 14 is a conceptual view schematically showing an example of the arrangement of the random number generation section 310. FIG. 15 is a view showing an example of operation of the random number generation section 310 described by the C programming language. Operation of the random number generation section 310 will be explained with reference to FIG. 15.

In the initialization step, the random number generation section 310 writes "0" in a register p[ii] (0=ii=25), and "1" in only a register p[12].

In the random number generation step, the random number generation section 310 calculates in units of pixels $$p[0]=((p[25]\hat{\ }p[24]\hat{\ }p[23]\hat{\ }p[22])\&1)$$

and generates a random number R within the range of $-17$ to 17 by

Random Number=$(1-2*p[22]*(((p[15]*64+p[16]*32+p[17]*16+p[18]*8+p[19]*4+p[20]*2+p[21]*17)/128)$ Note that in this arrangement example, the random number generation section 310 uses a random number of $-17$ to 17, but may generate a random number R falling within the range of $-15$ to 15 by changing this equation as follows:

Random Number=$(1-2*p[2]*(p[18]*8+p[19]*4+p[20]*2+p[21]$

In this case, the maximum value (17 in the example shown in FIGS. 14 and 15) of the generated random number R must be ½ or more the divisor (17) used for division by the division section 309 (the decimal part is dropped by rounding).

In the first embodiment, since the divisor used for division by the division section 309 is 17, 17/2=8 (the decimal part is dropped) and the maximum number of the random number generated by the random number generation section 310 must be set to 8 or more (17 in the example shown in FIGS. 14 and 15).

The sign inversion/data holding section 311 delays by the period of "p/2" pixels and outputs a random number obtained by inverting the sign of the random number R supplied from the random number generation section 310 at pixel positions given by "p×X" (p is an even number of 2 or more and X is an address value in the main scanning direction).

For example, when p is "2", the sign inversion/data holding section 311 temporarily holds the random number R supplied from the random number generation section 310 at "p×X" pixel positions, i.e., pixel positions "0, 2, 4, 6, 8, 10, 12, 14, . . . ", and outputs the held random number after inverting its sign at pixel positions "1, 3, 5, 7, 9, 11, 13, 15, . . . ".

In the first embodiment, the sign inversion/data holding section 311 refreshes the random number every pixel.

The selection section 312 selects the random number R supplied from the random number generation section 310 for each pixel or the random number supplied from the sign inversion/data holding section 311 in accordance with a pixel position signal, and supplies the selected random number as a random number RD to the addition section 307.

The pixel position signal controls the selection section 312 to select the random number supplied from the sign inversion/data holding section 311 only for pixel positions given by "p×X+p/2" (p is an even number of 2 to more and X is an address value in the main scanning direction), and otherwise select the random number R supplied from the random number generation section 310.

When the random number RD supplied from the selection section 312 is larger than ½ (8 when the decimal part is dropped) the divisor (17) used for division by the division section 309, the addition variable control section 313 corrects the large (redundant) random number RD in accordance with the image signal D to generate a random number (addition variable) P1.

FIG. 20 is a view showing processing of correcting the random number RD in the addition variable control section 313. In FIG. 20, the operation is described by the C programming language for descriptive convenience.

A constant SL is determined to set the output random number P1 to ½ the divisor (17) used for division by the division section 309 when the random number RD supplied from the selection section 312 is maximum. In the first embodiment, since the maximum value of the random number RD is 17 and the divisor used for division by the division section 309 is 17, the value SL is set to 2 from P1="maximum value of RD"/SL=17/2=8 (the decimal part is rounded down).

For an image signal D of N1 (e.g., 16) or less, the random number P1 is determined by $$P1=RD/SL$$

In this case, the addition section 307 adds the minimum random number P1 to the image signal D in addition to the above-mentioned addition value (8). The minimum random number is determined considering that the value of the image signal DR is divided by 17 in the division section 309, and has an amplitude value of −8 to 8 (amplitude=16). The addition section 307 adds to the image signal D a random number (P1+8) falling within the range of 0 to 16.

Letting a(a/2+a/2) be the amplitude of the random number, the value (except for the random number P1) added to the image signal D in the addition section 307 is a/2, and the divisor used for division by the division section 309 is |a|+1.

If the image signal D is larger than N1 and equal to or smaller than N2 (e.g., 32), the random number P1 is determined by $$P1=(RD-RD/SL)\times(D-N1)/(N2-N1)+RD/SL$$

Similarly, if the image signal D is equal to or larger than N3 (e.g., 201) and smaller than N4 (e.g., 233), the random number P1 is determined by $$P1=(RD-RD/SL)\times(N4-D)/(N4-N3)+RD/SL$$

If the image signal D is equal to or larger than N4, the minimum random number P1 is determined by $$P1=RD/SL$$

If the value of the image signal falls outside this range, the addition variable control section 313 directly outputs as the random number P1 the random number RD supplied from the selection section 312.

With this arrangement, the gradation conversion section 204 binarizes an input multilevel image signal D and supplies the binary signal N to the printer section 105. The printer section 105 forms an image on the recording sheet in accordance with the binary signal N.

(Second Embodiment)

The second embodiment is a modification of the first embodiment. The difference from the first embodiment will be described below. Note that the same reference numerals as in the first embodiment denote the same parts, and a description thereof will be omitted.

Figure 21:
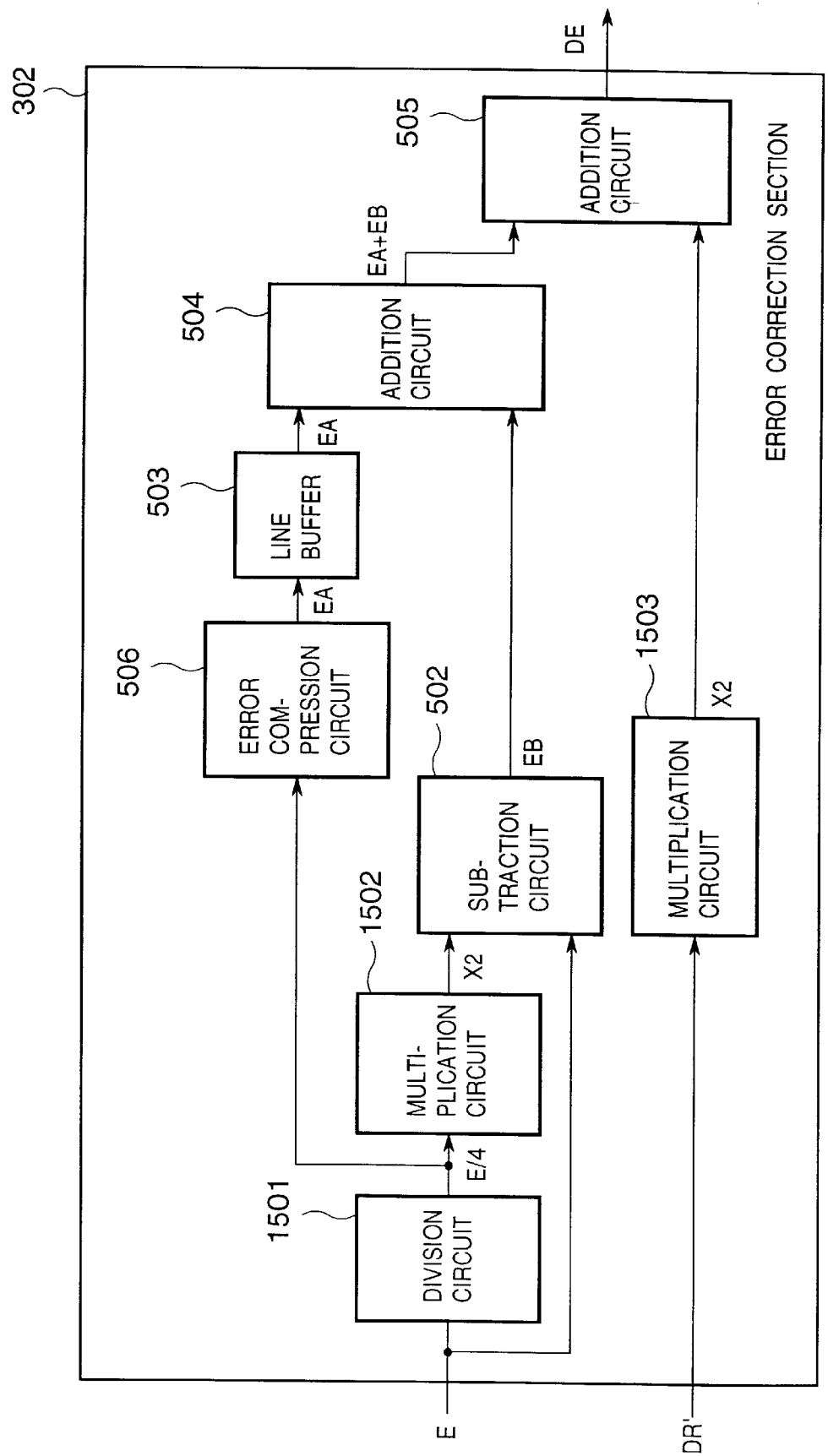
FIG. 21 is a block diagram showing an example of the arrangement of an error correction section according to the second embodiment.

FIG. 21 is a block diagram showing an example of the arrangement of an error correction section 302 according to the second embodiment. In the error correction section 302, the value of an image signal DR' supplied from a division section 309 is doubled by a multiplication circuit 1503 and supplied to an addition circuit 505, while an error component EA output from a line buffer 503 is directly supplied to an addition circuit 504. Since the value of the image signal DR' is doubled and processed, the degree of freedom for setting the coefficient Nmn for calculating the average density m can be increased.

The error correction section 302 shown in FIG. 21 receives the image signal DR' and binarization error data E, and generates and supplies to a binarization section 301 an image signal DE obtained by performing error correction for the image signal DR'.

The binarization error data E supplied to the error correction section 302 is limited to "−12 to +12" by limiter processing by a circuit (not shown) so as to avoid the influence of "false edge" when the input multilevel image signal D abruptly changes from a high density to a low density. In the error correction section 302, the value of the image signal DR' is doubled by the multiplication circuit 1503, and thus a binarization error generated in the binarization section 301 is also doubled compared to the first embodiment. Therefore, the limiter range is doubled compared to the first embodiment.

The binarization error data E limited to "−12 to +12" is divided by 4 by a division circuit 1501. The quotient (E/4) is supplied to a multiplication circuit 1502 and error compression circuit 506.

When the value of the image signal DR' is doubled, the binarization error data E is substantially doubled compared to the first embodiment. However, by dividing the value of the binarization error data E by 4 by the division circuit 1501 (which corresponds to dividing the error component E/2 by 2), the size of the error component supplied to the error compression circuit 506 falls within the same range as in the first embodiment. Accordingly, the number of bits of the error component compressed by the error compression circuit 506 is the same as in the first embodiment, and the capacity of the line buffer 503 can be kept equal to the capacity in the first embodiment. multiplication circuit 1502 doubles the quotient (E/4) supplied from the division circuit 1501 by shifting the quotient by one bit, and supplies the resultant value to a subtraction circuit 502. The subtraction circuit 502 calculates a difference EB (=(E−(E/4)×2) between the binarization error data E and arithmetic result (E/4×2), and supplies the difference EB to the addition circuit 504.

Similar to the first embodiment, the error compression circuit 506 uses two pixels as a unit, adds the arithmetic result (E/4) belonging to each unit to generate a compressed error component EA, and supplies the error component EA to the line buffer 503.

The error component EA supplied from the line buffer 503 is directly supplied to the addition circuit 504, unlike the first embodiment. This is because the binarization error data E is reduced to ¼ by the division circuit 1501 (½ in the first embodiment) and thus the error component EA supplied from the line buffer 503 corresponds to ½ (error component to be distributed) the binarization error data E. That is, in the first embodiment, the error component output from the line buffer 503 is halved. Instead, in the second embodiment, the error component is halved (E/2×½) by the division circuit 1501 before a write in the line buffer 503.

The addition circuit 504 adds the error component EA supplied from the addition circuit 504 and the error component EB supplied from the subtraction circuit 502, and supplies the sum (EA+EB) to the addition circuit 505. The addition circuit 505 adds the error component sum (EA+EB) and image signal DR', and supplies the sum as an image signal DE to the binarization section 301. In the second embodiment, as the image signal DE is substantially doubled in comparison with the first embodiment, the binarization error data E, average density m, and binarization slice values S' and S are also substantially doubled in comparison with the first embodiment. Hence, the average density m can be doubled compared to the first embodiment by using, e.g., the coefficients shown in FIG. 22 in the average density calculation section 304 shown in FIG. 12, instead of the coefficients shown in FIG. 13.

Figure 22:
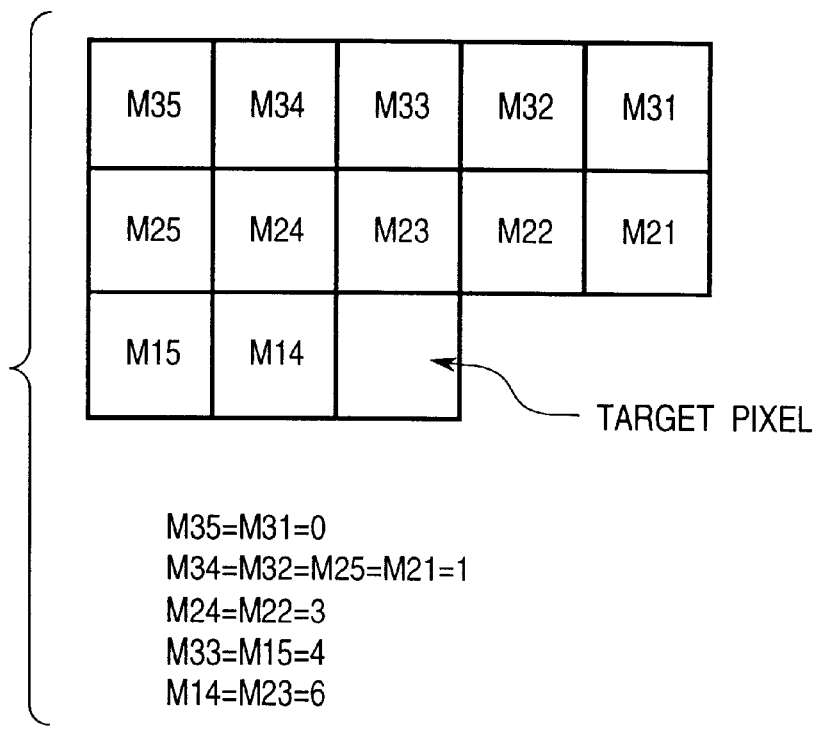
FIG. 22 is a view showing the relationship between the reference data Nmn and the pixel of interest in the second embodiment.
Figure 24:
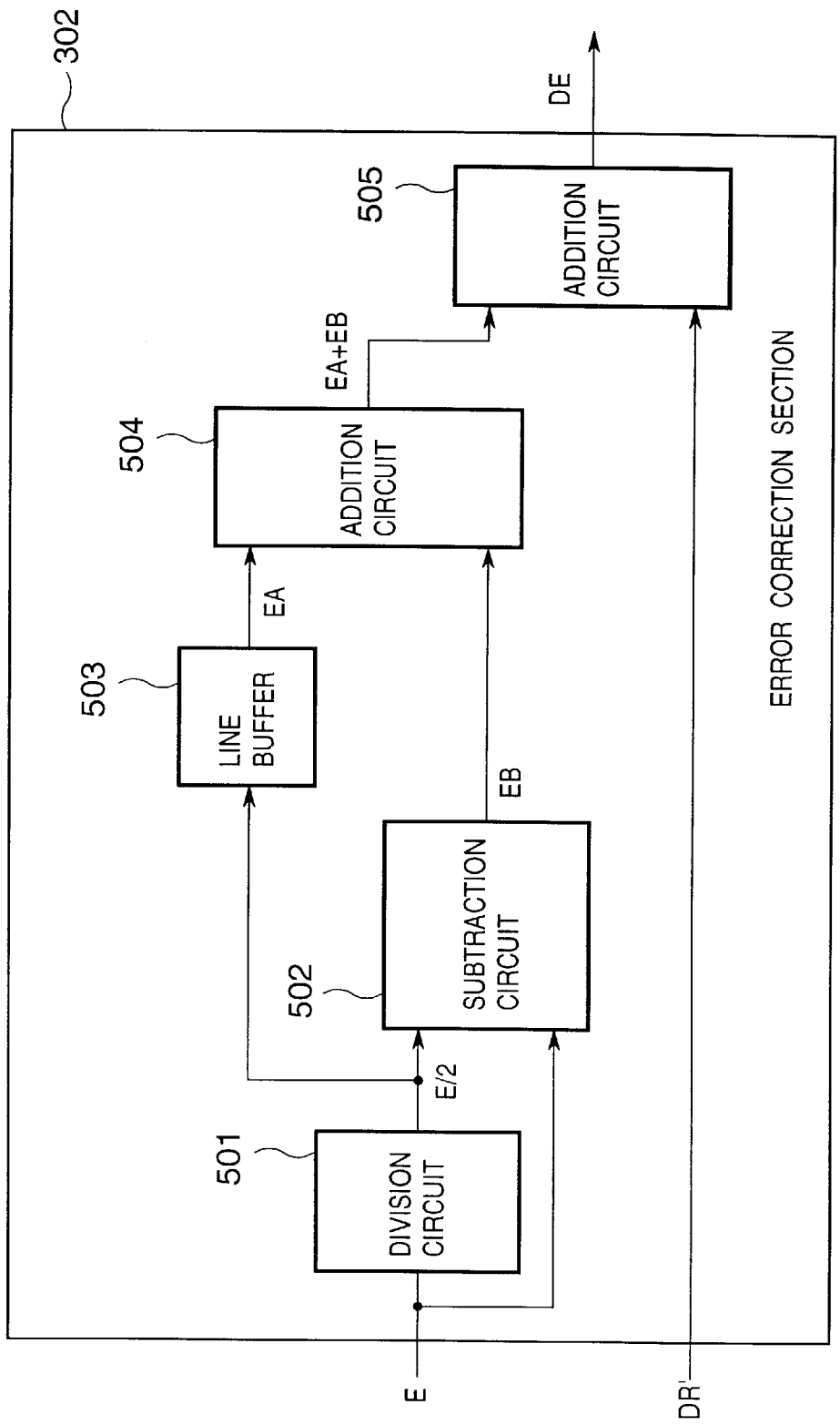
FIG. 24 is a block diagram showing an example of the conventional arrangement of the error correction section.

To double the average density m, the total number (=30) of coefficients shown in FIG. 22 is set double the total number (=15) of coefficients shown in FIG. 13. A larger total number of coefficients can increase the degree of freedom for setting the ratio of coefficients. For this reason, the second embodiment can execute texture control more easily than the first embodiment.

FIG. 23 is a view showing an example of operation of a threshold calculation section 305 in the second embodiment that is described by the C programming language.

(Another Embodiment)

In the first and second embodiments, the error compression circuit 506 uses two pixels as a unit, and replaces error components for two pixels belonging to each unit with the sum of these error components to compress error component data. The present invention can be applied when n (n=2) pixels form a unit and error components for n pixels belonging to each unit are replaced with the sum of these error components to compress error component data. The compression effect is enhanced by a larger compression unit number n (n>2). When, e.g., the error reconstruction circuit is arranged as in the first embodiment, the compressed error component can be reconstructed by 1/n multiplication.

In the second embodiment, the error correction section doubles the value of a pixel of interest and adds the resultant value and an error component to be distributed. The present invention can be applied when the value of a pixel of interest is multiplied by m (m=2) and the resultant value and an error component to be distributed are added. A larger number m (m>2) can increase the degree of freedom for texture control.

The first and second embodiments have exemplified a method of binarizing a multilevel image signal and forming a pseudo halftone image by the binary signal. This method can be applied when a multilevel image signal is converted into a signal of k (k≧2) levels to form a pseudo halftone image based on the k-level signal.

The first and second embodiments have exemplified ordered dithering, but the present invention can also be applied to other area gradation methods such as error diffusion, and the like.

The first and second embodiments concern a method of forming a monochrome image, but the present invention can also be applied to a method of forming a color image.

Note that the present invention may be applied to either a system constituted by a plurality of equipments or an apparatus consisting of a single equipment.

The present invention applied by the present inventor also includes an apparatus or method realized by some of all constituents constituting the apparatus or method according to the above embodiments.

The functions of the apparatus according to the above-mentioned embodiments are also achieved by temporarily or permanently assembling a memory medium which records a program code in the system or apparatus, and reading out and executing the program codes stored in the memory medium by a computer (or a CPU or MPU) of the system or apparatus. In this case, the program code itself read out from the memory medium or the memory medium itself constitutes the present invention.

As the memory medium for supplying the program code, for example, a floppy disk, hard disk, optical disk, magneto-optical disk, CD-ROM, CD-R, magnetic tape, nonvolatile memory card, ROM, and the like can be used, but other devices can also be adopted.

The functions unique to the present invention may be realized not only by executing the readout program code from the memory medium by the computer but also by some or all of actual processing operations executed by an OS (Operating System) running on the computer on the basis of an instruction by the program code.

Furthermore, the technical scope of the present invention also includes an embodiment of executing some or all of actual processing operations by a CPU or the like arranged in a function extension board or a function extension unit, which is inserted in or connected to the computer, after the program code read out from the memory medium is written in a memory of the extension board or unit.

[Effect of Embodiments]

The above embodiments can reduce the capacity of a line memory for storing quantization errors by compressing, in units of n (n≧2) pixels, quantization errors generated by processing of converting a multilevel image signal into a signal of k (k≧2) levels.

For example, assume that a line memory having a capacity for 4,800 3-bit pixels (4,800×3=14,400) is required to process an image having a resolution of 400 dpi. In the prior art, if the resolution increases to 600 dpi, a line memory having a capacity of 7,200 pixels×3 bits=21,600 bits is required.

In the above embodiments, however, even if the resolution increases to 600 dpi, a line memory having a capacity of 3,600 pixels×4 bits=14,400 bits suffices, which is very advantageous in cost.

In addition, error compression processing according to these embodiments hardly deteriorates the image quality.

The present invention can reduce the capacity of a memory necessary for image processing.

The present invention is not limited to the above embodiments and various changes and modifications can be made within the spirit and scope of the present invention. Therefore, to apprise the public of the scope of the present invention the following claims are made.

What is claimed is:

1. An image processing apparatus for quantizing a multilevel image signal, comprising:

quantization means for quantizing a multilevel image signal for a pixel of interest;

compression mean for compressing an error component generated based on a quantization error generated by quantization, and storing the compressed error component in a memory;

reconstruction means for reading out the compressed error component from the memory and reconstructing the error component; and correction means for correcting the multilevel image signal for the pixel of interest referred to by said quantization means on the basis of the reconstructed error component, wherein said compression means uses n (n≧2) pixels as a unit, generates synthesis data obtained by synthesizing error components belonging to each unit, and stores the synthesis data in the memory as a compressed error component for the unit.

2. The apparatus according to claim 1, wherein said reconstruction means decomposes each synthesis data as a compressed error component read out from the memory, thereby reconstructing an error component for each pixel.

3. The apparatus according to claim 1, wherein said compression means calculates a sum of error components belonging to each unit, and stores the sum in the memory as an error component compressed for the unit.

4. The apparatus according to claim 3, wherein said reconstruction means multiplies by 1/n each sum as a compressed error component read out from the memory, and outputs the product for a period of n pixels.

5. The apparatus according to claim 1, wherein the memory is a line memory.

6. An image processing apparatus for quantizing a multilevel image signal, comprising:

first arithmetic means for multiplying a signal value of a multilevel image signal by n (n≧2) to generate an n-multiple image signal;

quantization means for quantizing the n-multiple image signal for a pixel of interest;

second arithmetic means for multiplying by 1/n an error component generated based on a quantization error generated by quantization to generate a 1/n-multiple error component;

storage means for using n pixels as a unit, calculating a sum of 1/n-multiple error components belonging to each unit, and storing the sum in a memory as an error component corresponding to the unit;

read means for reading out an error component corresponding to each unit from the memory and outputting the error component for a period of n pixels; and correction means for correcting the n-multiple image signal for the pixel of interest output from said first arithmetic means on the basis of an output from said read means, and supplying the n-multiple image signal to said quantization means.

7. An image processing method of quantizing a multilevel image signal, comprising:

a quantization step of quantizing a multilevel image signal for a pixel of interest;

a compression step of compressing an error component generated based on a quantization error generated by quantization, and storing the compressed error component in a memory;

a reconstruction step of reading out the compressed error component from the memory and reconstructing the error component; and a correction step of correcting the multilevel image signal for the pixel of interest referred to in the quantization step on the basis of the reconstructed error component, wherein the compression step comprises the step of using n (n≧2) pixels as a unit, generating synthesis data obtained by synthesizing error components belonging to each unit, and storing the synthesis data in the memory as a compressed error component for the unit.

8. The method according to claim 7, wherein the reconstruction step comprises a step of decomposing each synthesis data as a compressed error component read out from the memory, thereby reconstructing an error component for each pixel.

9. The method according to claim 7, wherein the compression step comprises a step of calculating a sum of error components belonging to each unit, and storing the sum in the memory as an error component compressed for the unit.

10. The method according to claim 9, wherein the reconstruction step comprises a step of multiplying by 1/n each sum as a compressed error component read out from the memory, and using the product as an error component for each of n pixels.

11. The method according to claim 7, wherein the memory is a line memory.

12. An image processing method of quantizing a multilevel image signal, comprising:

a first arithmetic step of multiplying a signal value of a multilevel image signal by n (n≧2) to generate an n-multiple image signal;

a quantization step of quantizing the n-multiple image signal for a pixel of interest;

a second arithmetic step of multiplying by 1/n an error component generated based on a quantization error generated by quantization to generate a 1/n-multiple error component;

a storage step of using n pixels as a unit, calculating a sum of 1/n-multiple error components belonging to each unit, and storing the sum in a memory as an error component corresponding to the unit;

a read step of reading out an error component corresponding to each unit from the memory and using the error component as an error component for each pixel belonging to the unit; and a correction step of correcting the n-multiple image signal for the pixel of interest generated in the first arithmetic step on the basis of an error component for each pixel generated in the read step, the quantization step comprising a step of quantizing the n-multiple image signal for the pixel of interest corrected in the correction step.

13. A memory medium storing an image processing program for quantizing a multilevel image signal, the image processing program comprising:

a program code of a quantization step of quantizing a multilevel image signal for a pixel of interest;

a program code of a compression step of compressing an error component generated based on a quantization error generated by quantization, and storing the compressed error component in a memory;

a program code of a reconstruction step of reading out the compressed error component from the memory and reconstructing the error component; and a program code of a correction step of correcting the multilevel image signal for the pixel of interest referred to in the quantization step on the basis of the reconstructed error component, wherein, the compression step comprises a step of using n (n≧2) pixels as a unit, generating synthesis data obtained by synthesizing error components belonging to each unit, and storing the synthesis data in the memory as a compressed error component for the unit.

14. A memory medium storing an image processing program for quantizing a multilevel image signal, the image processing program comprising:

a program code of a first arithmetic step of multiplying a signal value of a multilevel image signal by n (n≧2) to generate an n-multiple image signal;

a program code of a quantization step of quantizing the n-multiple image signal for a pixel of interest;

a program code of a second arithmetic step of multiplying by 1/n an error component generated based on a quantization error generated by quantization to generate a 1/n-multiple error component;

a program code of a storage step of using n pixels as a unit, calculating a sum of 1/n-multiple error components belonging to each unit, and storing the sum in a memory as an error component corresponding to the unit;

a program code of a read step of reading out an error component corresponding to each unit from the memory and using the error component as an error component for each pixel belonging to the unit; and a program code of a correction step of correcting the n-multiple image signal for the pixel of interest generated in the first arithmetic step on the basis of an error component for each pixel generated in the read step, the program code of the quantization step comprising a program code of quantizing the n-multiple image signal for the pixel of interest corrected by the program code of the correction step.

15. A computer readable program for quantizing a multilevel image signal, comprising:

a program code of a quantization step of quantizing a multilevel image signal for a pixel of interest;

a program code of a compression step of compressing an error component generated based on a quantization error generated by quantization, and storing the compressed error component in a memory;

a program code of a reconstruction step of reading out the compressed error component from the memory and reconstructing the error component; and a program code of a correction step of correcting the multilevel image signal for the pixel of interest referred to in the quantization step on the basis of the reconstructed error component, wherein, the compression step comprises a step of using n (n≧2) pixels as a unit, generating synthesis data obtained by synthesizing error components belonging to each unit, and storing the synthesis data in the memory as a compressed error component for the unit.

16. A computer readable program for quantizing a multilevel image signal, comprising:

a program code of a first arithmetic step of multiplying a signal value of a multilevel image signal by n (n≧2) to generate an n-multiple image signal;

a program code of a quantization step of quantizing the n-multiple image signal for a pixel of interest;

a program code of a second arithmetic step of multiplying by 1/n an error component generated based on a quantization error generated by quantization to generate a 1/n-multiple error component;

a program code of a storage step of using n pixels as a unit, calculating a sum of 1/n-multiple error components belonging to each unit, and storing the sum in a memory as an error component corresponding to the unit;

a program code of a read step of reading out an error component corresponding to each unit from the memory and using the error component as an error component for each pixel belonging to the unit; and a program code of a correction step of correcting the n-multiple image signal for the pixel of interest generated in the first arithmetic step on the basis of an error component for each pixel generated in the read step, the program code of the quantization step comprising a program code of quantizing the n-multiple image signal for the pixel of interest corrected by the program code of the correction step.

* * * * *

UNITED STATES PATENT AND TRADEMARK OFFICE
CERTIFICATE OF CORRECTION

PATENT NO. : 6,519,366 B1
DATED : February 11, 2003
INVENTOR(S) : Kaburagi

It is certified that error appears in the above-identified patent and that said Letters Patent is hereby corrected as shown below:

Title page,
Item [56], References Cited, U.S. PATENT DOCUMENTS, insert the following:

| -- 5,931,960 | 8/1999 | Kletter et al. |
|---|---|---|
| 6,173,081 | 1/2001 | Nishikawa |
| 5,289,549 | 2/1994 | Rattey et al. |
| 6,011,907 | 1/2000 | Shimura et al. |
| 5,692,109 | 11/1997 | Shu |
| 4,386,366 | 5/1983 | Mori |
| 5,465,164 | 11/1995 | Sugiura et al. |
| 4,975,786 | 12/1990 | Katayama et al. |
| 5,757,976 | 5/1998 | Shu |
| 5,748,794 | 5/1998 | Maeda et al. |
| 6,128,413 | 10/2000 | Benamara -- |

Item [75], Inventor, "Yokohoama (JP)" should read -- Yokohama (JP) --.

Drawings,
Sheet 3, Fig. 3, in block 308, "VALIABLE" should read -- VARIABLE --.
Sheet 16, Fig. 16, in block 308, "VALIABLE" should read -- VARIABLE --.

Column 1,
Line 30, "abinarization" should read -- binarization --.

Column 6,
Line 42, "perform" should read -- performs --;
Line 50, "valiable" should read -- variable --; and
Line 64, "valiable" should read -- variable --.

Column 9,
Line 5, "limitter" should read -- limiter --.

Column 10,
Line 8, "valiable" should read -- variable --.

UNITED STATES PATENT AND TRADEMARK OFFICE
CERTIFICATE OF CORRECTION

PATENT NO.    : 6,519,366 B1
DATED         : February 11, 2003
INVENTOR(S)   : Kaburagi It is certified that error appears in the above-identified patent and that said Letters Patent is hereby corrected as shown below:

Column 13,
Line 2, "to" should read -- or --.

Signed and Sealed this

Twentieth Day of January, 2004

JON W. DUDAS
*Acting Director of the United States Patent and Trademark Office*